Figure 1:
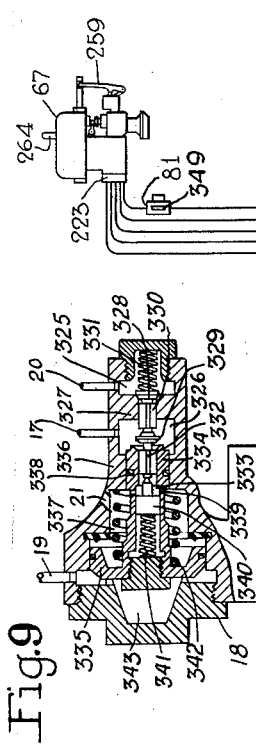

April 29, 1952  H. C. MAY ET AL  2,594,575
CONTROL MECHANISM
Filed Feb. 10, 1944  5 Sheets-Sheet 1

INVENTORS
Harry C. May
Roy R. Stevens
BY
ATTORNEY

April 29, 1952  H. C. MAY ET AL  2,594,575
CONTROL MECHANISM
Filed Feb. 10, 1944  5 Sheets-Sheet 2
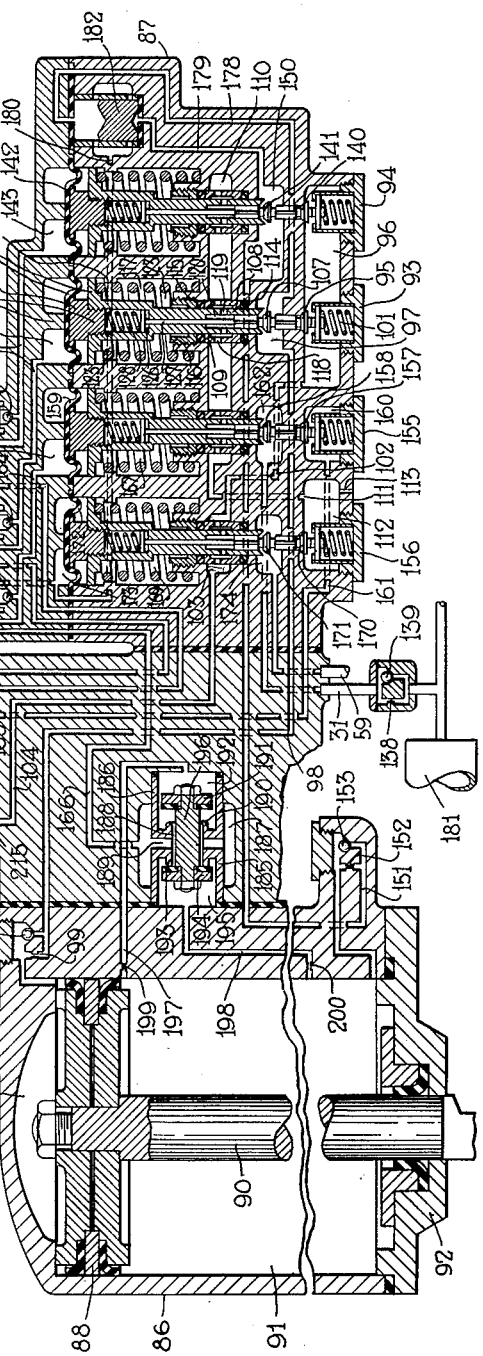
Fig. 2
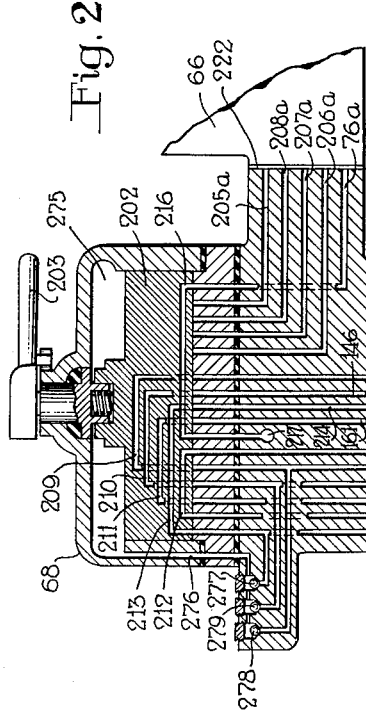
Fig. 3
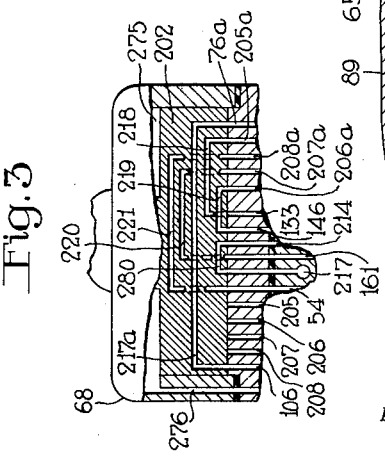
INVENTORS
Harry C. May
Roy R. Stevens
ATTORNEY April 29, 1952
H. C. MAY ET AL
2,594,575
CONTROL MECHANISM
Filed Feb. 10, 1944
5 Sheets-Sheet 3
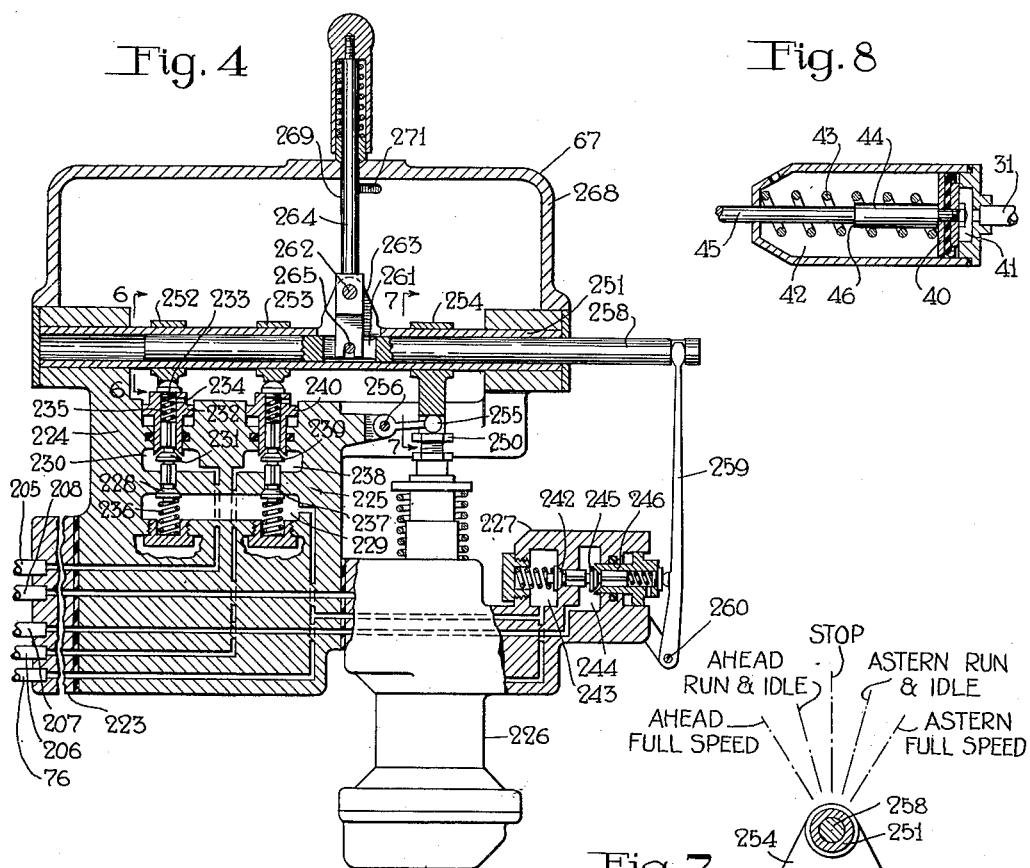
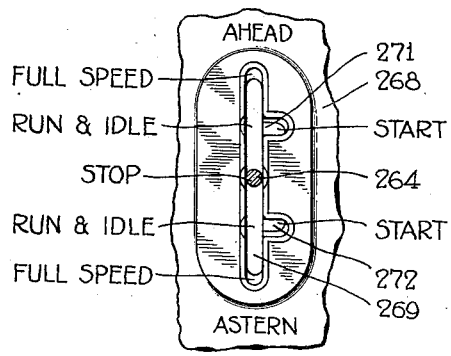
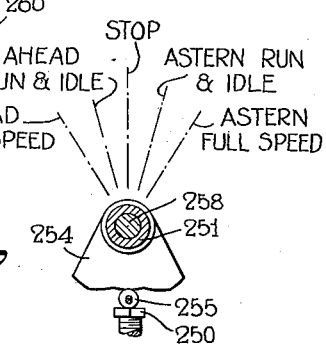
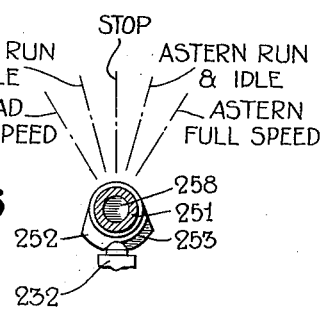
INVENTORS
Harry C. May
Roy R. Stevens
BY
A. M. Higgins
ATTORNEY April 29, 1952 H. C. MAY ET AL 2,594,575
CONTROL MECHANISM
Filed Feb. 10, 1944 5 Sheets-Sheet 4

INVENTORS
Harry C. May
Roy R. Stevens
BY
ATTORNEY

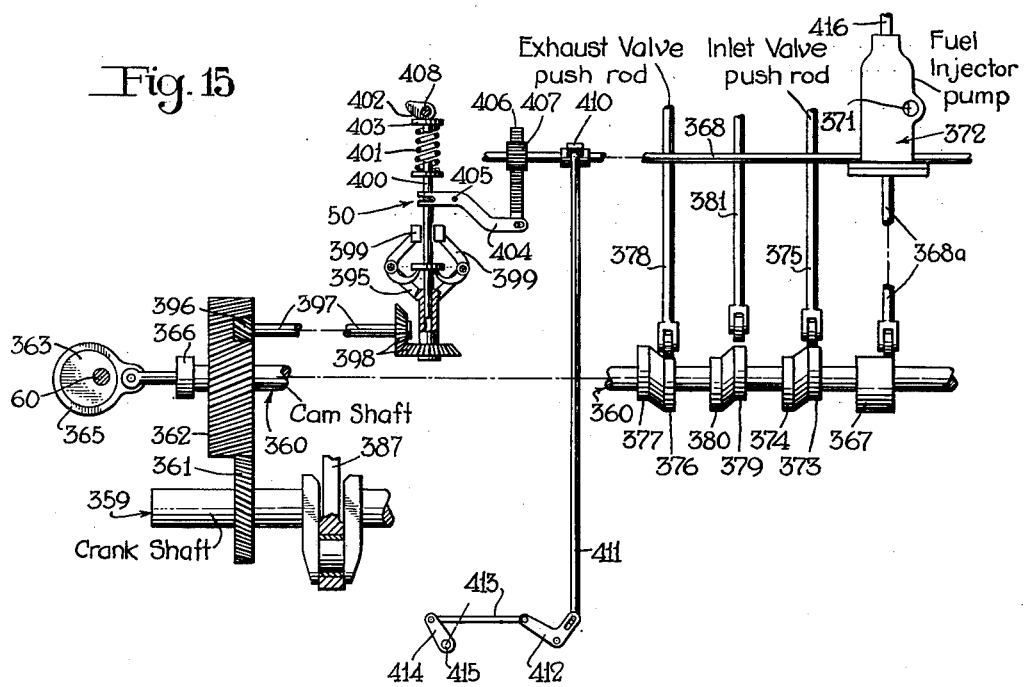
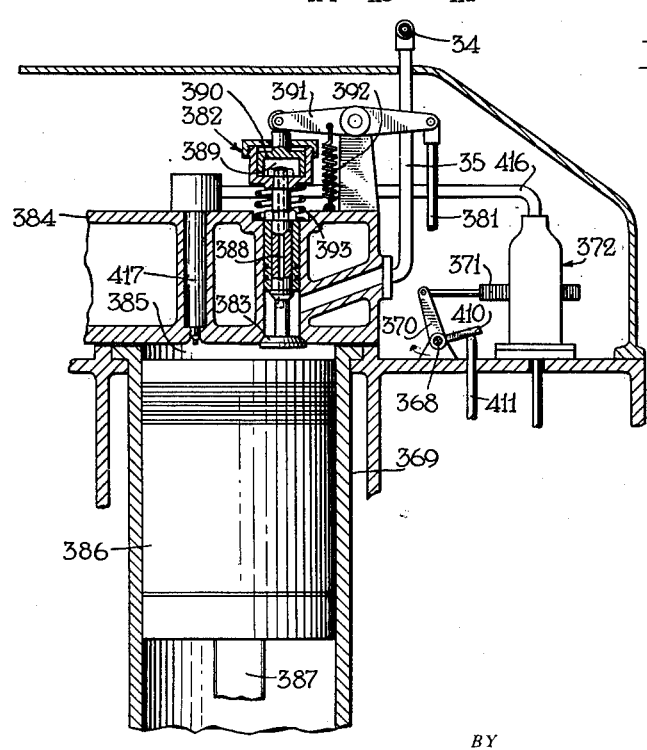

Patented Apr. 29, 1952

2,594,575

UNITED STATES PATENT OFFICE 2,594,575

CONTROL MECHANISM

Harry C. May, East McKeesport, and Roy R. Stevens, Forest Hills, Pa., assignors to Westinghouse Air Brake Company, a corporation of Pennsylvania Application February 10, 1944, Serial No. 521,798

26 Claims. (Cl. 192—3)

This invention relates to control mechanism and more particularly to a fluid pressure control system for controlling a plurality of different operations in a desired sequence, such for example, as incident to controlling a reversible internal combustion engine.

Certain internal combustion engines are arranged to run in either direction and the direction of operation is usually determined by the valve timing or the condition of reversing means or valve gear which controls, in proper sequence, the starting of the engine, as by compressed air, and the supply of fuel to the engine. In certain engines the valve timing is controlled by different sets of cams on a cam shaft, one set of cams providing for operation of the engine in one direction and another set of cams providing for operation of the engine in the reverse direction. The cam shaft is movable longitudinally relative to the crank shaft for rendering either the one set of cams or the other effective.

In reversing an engine, such as just described, it is customary first to cut off the supply of fuel to the engine, to then reverse the cams, to next supply compressed air to the engine, under the control of the reversed valve timing, for braking the engine in case it has not stopped and, after the engine is stopped, for starting the engine to turn in the reverse direction. After the engine is thus placed in motion, it is customary to then cut off the supply of starting air to the engine. Fuel may also be resupplied to the engine after the cams have been reversed for causing the engine to run in the new or reversed direction. After the engine is running its speed may be varied by an operator from idling to a maximum degree usually by varying the adjustment of a speed governor device driven by the engine. The cutting off of fuel to the engine in order to stop same may be obtained by rendering the usual fuel pump or pumps inoperative to pump fuel, and the stopping of the engine is often accelerated by the use of a brake which is particularly desirable to obtain reversal of the engine in as short an interval of time as possible.

One object of the invention is the provision of an improved system for controlling in proper sequence a plurality of different operations such as required for stopping, starting and reversing an engine, such as above described.

Another object of the invention is the provision of such a system which provides for control of the different operations pneumatically without the use of mechanical elements which are subject to wear and require adjustments, such as cams, control shafts and gears or the like, and which system is equally well adapted for either local or remote control.

Another object of the invention is the provision of a pneumatic control system providing for either individual or multiple control of a plurality of reversible internal combustion engines.

Another object of the invention is the provision of such a system also arranged to control braking means for the engine or engines and to prevent operation of said braking means to brake the engine or engines upon stopping of any one engine while another engine is operating.

Other objects and advantages will be apparent from the following more detailed description of the invention.

Figure 12:
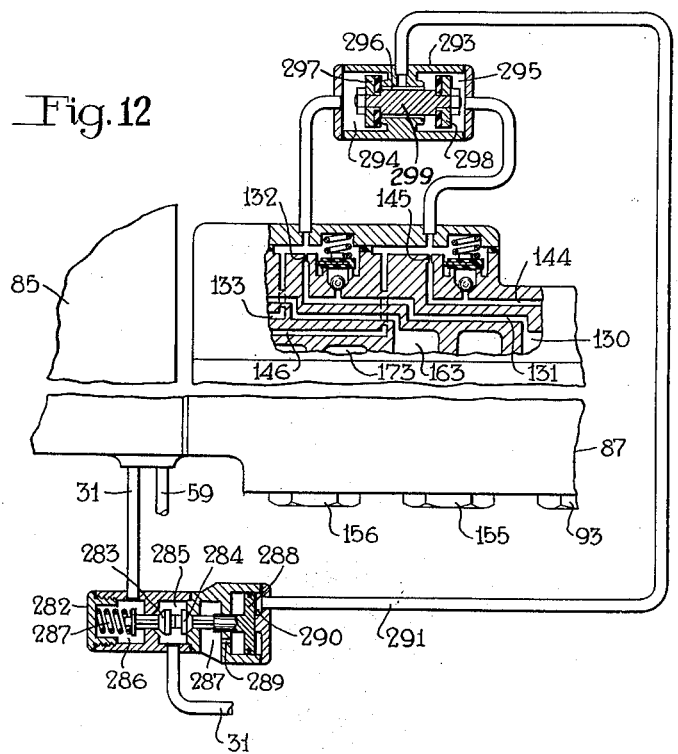
Figure 13:
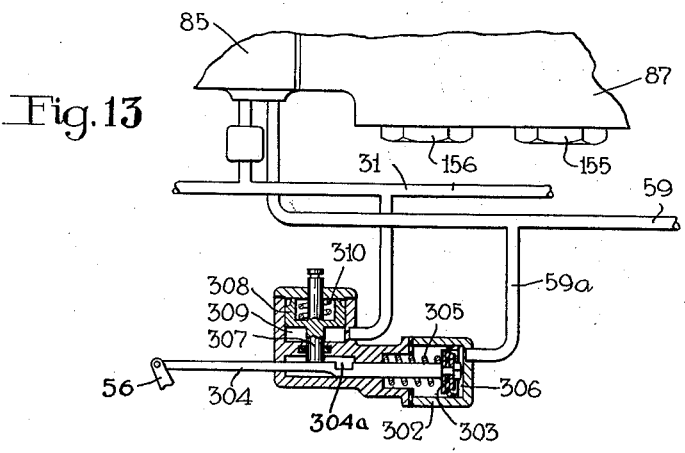
Figure 14:
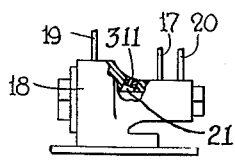

In the accompanying drawings: Fig. 1 is a diagrammatic view, mainly in elevation, of a pneumatic control system for a plurality of engines embodying the invention; Fig. 2 is a vertical, sectional view of a pneumatic control device associated with each of the engines shown in Fig. 1 for controlling the individual starting, stopping, reversing, etc., of the respective engine; Fig. 3 is a diagrammatic sectional view of a portion of a selector valve device shown in Fig. 1 in elevation and in Fig. 2 in section, but with the selector or rotary valve in a different position than shown in Fig. 2; Fig. 4 is a diagrammatic sectional view of an operator's control device several of which are employed and distributed at different control stations as shown in elevation in Fig. 1; Fig. 5 is a partial plan view of the operator's control device shown in Fig. 4; Figs. 6 and 7 are sectional views taken on the lines 6—6 and 7—7, respectively, in Fig. 4; Fig. 8 is a sectional view of a pneumatic cylinder several of which are shown in elevation in Fig. 1; Figs. 9, 10 and 11 are horizontal sectional views of different elements shown in outline in Fig. 1; Figs. 12 and 13 are diagrammatic views of two different modifications of the invention shown associated with a portion of the structure shown in Fig. 2; Fig. 14 is a side elevational view of a device shown in Fig. 1 but embodying a modification thereof; Fig. 15 is a diagrammatic view of engine structure for controlling reversing and starting of the engine and the supply of fuel to the engine; and Fig. 16 is a cross-sectional view through one cylinder of the engine showing additional structure.

DESCRIPTION FIGS. 1 TO 11

In Fig. 1 of the drawings, the reference numerals 1 and 2 indicate two like internal combustion engines of the reversible diesel type which are arranged to be connected through hydraulic couplings 4a and 5a and clutches 4 and 5 respectively, to a common drive shaft 3. The hydraulic couplings 4a and 5a are constantly effective, while each of the clutches 4 and 5 may be provided with a manually operable lever 6 having what may be called an engaged position, in which it is shown in the drawing, for effecting operation of the clutch to connect the respective engine to the drive shaft 3, and being movable to what may be called a disengaged position, indicated by a dot and dash line 7, for actuating the clutch to disconnect the respective engine from said drive shaft.

A sprocket wheel 8 secured to turn with the drive shaft 3 is connected by a chain 9 to a sprocket wheel 10 which is arranged to turn a shaft 11 which may be a ship's propeller shaft.

A brake is associated with propeller shaft 11 for braking same to stop either or both of the engines 1 and 2. This brake may comprise a brake drum 12 arranged to turn with the propeller shaft 11, and brake shoes 13 arranged at opposite sides of the brake drum for frictionally engaging same. The brake shoes 13 are carried by levers 14 which are operably connected to a controlling lever 15. One end of lever 15 is operatively connected to a brake cylinder device 16 arranged to be operated by fluid under pressure supplied through a pipe 17 for actuating said lever to move the brake shoes 13 into frictional engagement with drum 12. Upon release of fluid under pressure from said brake cylinder device by way of pipe 17, lever 15 will operate to allow the release movement of the brake shoes 13 away from the brake drum. The supply and release of fluid under pressure to and from the brake cylinder device 16 by way of pipe 17 is arranged to be controlled by a relay valve device 18. The relay valve device 18 comprises, as shown in Fig. 9 of the drawing, a casing having chambers 325 and 326 separated by a wall 327 and containing, respectively, two coaxially aligned poppet valves 328 and 329 arranged to seat in the same direction. The valve 328 has a fluted stem 330 extending through a bore in wall 327 into chamber 326 wherein it engages the valve 329. A spring 331 in chamber 325 acts on valve 328 urging it toward a seat provided on wall 327.

The valve 329 has a fluted stem 332 arranged to slide in a portion of a bore 333 provided in a plunger 334 which projects from one side of a piston 335 and which is slidably mounted in a bore provided through a wall 336 separating chamber 326 from a chamber 337 at said one side of said piston. A sealing ring 338 carried by plunger 334 has sliding and sealing contact with the surface of the bore through wall 336 to prevent leakage of fluid under pressure from chamber 326 past said plunger to chamber 337. A seat is provided on the end of plunger 334 for engagement by valve 329.

The bore 333 in plunger 334 is open through one or more ports 339 to chamber 337 and slidably mounted in said bore is a follower 340 one end of which engages the valve stem 332. A precompressed spring 341 contained in bore 333 is interposed between the opposite end of plunger 340 and the piston 335 for unseating valve 329 from the end of plunger 334. A coil spring 342 encircling plunger 334 in chamber 337 has one end supported on the casing wall 336 while the opposite end bears against piston 335. Spring 342 is also under pressure and is constantly effective to urge the piston 335 to the position shown in the drawing for pulling plunger 334 out of seating engagement with 329.

The valve chamber 325 is open to a fluid pressure supply pipe 20 adapted to be supplied with fluid under pressure from any suitable source. Valve chamber 326 is connected to pipe 17 leading to the brake cylinder device 16. Chamber 337 is open to atmosphere through a port 21, while at the opposite side of piston 335 is a control chamber 343 which is connected to a control pipe 19.

The operation of the relay valve device 18 is as follows:

When fluid under pressure is supplied to chamber 343, in a manner which will be later described, the piston 335 will move against spring 342 and shift the plunger 334 first into seating engagement with valve 329 and then act through said valve to open valve 328. When valve 328 is thus unseated, fluid under pressure from the supply pipe 20 will flow to pipe 17 and thence to the brake cylinder device 16 to effect operation of said device to apply the brake to the propeller shaft 11, as above described.

Upon release of fluid under pressure from piston chamber 343, spring 342 will return piston 335 to the position shown in the drawing. The pressure of spring 331 on valve 328 is greater than the opposing pressure of spring 341 on the valve stem 332, so that, as piston 335 is returned to the position shown in the drawing, the spring 331 will move the two valves 328 and 329 in unison and with said piston until valve 328 becomes seated to cut-off the supply of fluid under pressure to the brake cylinder pipe 17. After valve 328 is seated, the spring 341 will hold valve 329 against movement, so that, plunger 334 moving with piston 335 as it returns to the position shown in the drawing, will move out of seating engagement with valve 329 and thereby open pipe 17 to atmosphere by way of chamber 337 and port 21 for releasing fluid under pressure from the brake cylinder device 16 to thereby release the brake on the propeller shaft 11, as above described.

The pipe 19 leads to the side outlet of a double check valve device 22, the opposite end outlets of which device are connected by pipes 23 and 24 to brake interlock valve devices 25 and 26 associated with the clutches 4 and 5, respectively. The double check valve device 22 is of conventional structure and, as shown in Fig. 10 of the drawings, comprises a shuttle valve 344 which upon supply of fluid under pressure to pipe 23 with pipe 24 vented, will operate in the usual manner to open pipe 23 to pipe 19 and close communication between pipe 19 and pipe 24, while upon supply of fluid under pressure to pipe 24 with pipe 23 vented the shuttle valve 344 will operate to open pipe 24 to pipe 19 and close communication between pipes 19 and 23.

The supply and release of fluid under pressure to and from the pipes 23 and 24 is under the control of the brake interlock valve devices 25 and 26, respectively. These devices are identical, in construction and, for illustrative purposes, each may comprise a casing containing a rotary type plug valve 27 arranged to be turned to either of two different positions by a lever 28. At the interlock valve device 25, the end of lever 28 is connected by a rod 29 to the clutch control lever 6 associated with engine 1, while at the brake interlock valve device 26, the lever 28 is connected by a corresponding rod 29 to the clutch control lever 6 associated with engine 2. It will thus be seen that movement of either clutch control lever 6 to its engaged position or its disengaged position will turn the respective plug valve 27 to corresponding positions.

The plug valve 27 in each of the brake interlock valve devices 25 and 26 is provided with a passage 30 arranged to connect the respective pipe 23 or 24 to atmosphere when the respective clutch control lever 6 is in the clutch disengaged position and to connect said pipe to a control pipe 59 when the lever is in the clutch engaged position. The pipe 59 at each engine is arranged to be either supplied with fluid under pressure or to be opened to the atmosphere in a manner which will be later described.

Each of the engines comprises (Figs. 15 and 16) a crankshaft 359 for operating the drive shaft 3, and an axially movable cam shaft 360 driven in proper phase with said crankshaft by gears 361 and 362 on said shafts. The cam shaft 360 has an astern position, in which it is shown in Fig. 15 of the drawings, and is movable from this position to an ahead position by means of an eccentric 363 mounted on a reversing control shaft 60 and connected to one end of the cam shaft 360 through a ring 365 and a suitable swivel connection 366. The gear 362 on the cam shaft 360 is of sufficient width to maintain driving relation with gear 361 on the crankshaft 360 in both positions of the cam shaft.

The cam shaft 360 is provided with a cam 367 which in both positions of said shaft is arranged to operate a plunger 368a to control a fuel control shaft 368 extending the length of the engine. At each engine cylinder 369 the fuel control shaft 368 is provided with an arm 370 operatively connected to one end of a fuel control rack 371 of a fuel injector pump 372 which is operable upon turning of the shaft 368 in a clockwise direction (Fig. 16) to increase the supply of fuel to the engine cylinder through a pipe 416 and an injector nozzle 417 disposed in a pressure head 384 for said cylinder. The rod 368 is shown in Fig. 16 in a position for cutting off the supply of fuel to the cylinder.

The cam shaft 360 is also provided with astern and ahead cams 373 and 374 for operating a push rod 375 connected to the inlet valve (not shown) for cylinder 369, and astern and ahead cams 376 and 377, for operating a push rod 378 to control an exhaust valve (not shown) for said cylinder, in the astern and ahead positions, respectively, of said shaft. The cam shaft is further provided with astern and ahead cams 379 and 380 for operating a push rod 381 and rocket arm 391 to control an air starting valve device 382 for the cylinder 369, in the astern and ahead positions, respectively, of said shaft.

It will be understood that there is a fuel injector pump 372 for each engine cylinder, although only one pump and cylinder are shown in the drawings, and that all of the fuel injector pumps are controlled by the fuel control shaft 368 and cams 367. However, the cam shaft 360 will be provided with a pair of astern and ahead cams, such as above described, for controlling the exhaust valve and the inlet valve for each of the engine cylinders, and for controlling the air starting valve device 382 at each cylinder.

The air starting valve device 382, located in the cylinder head 384, may comprise an air inlet valve 383, for directing starting air from a starting air pipe or header 34 and branch pipe 35 into a combustion chamber 385. The chamber 385 is provided above a piston 386 in the cylinder 369 and the design of cams 379 and 380 is such that the starting air will be supplied to said chamber on the power stroke of said piston, in order to operate said piston to start the engine, it being noted that said piston is connected by a piston rod 387 to the crankshaft 359. When starting air is directed into the cylinder head 384 by way of branch pipe 35, this air becomes effective through a passage 388 in the stem of valve 383 in an air cylinder 389 and causes a piston 390 in said cylinder to move upwardly which operates rocker 391 to move the push rod 381 downwardly into contact with either cam 379 or cam 380 on the cam shaft 360, depending upon the position of said shaft, whereby said cam may control the opening of the air supply valve 383. When there is no air in the starting air header 34, pipe 35 and cylinder 389, a tension spring 392 connected to rocker 391 will lift the push rod 381 out of contact with the cam 379 or 380 under which condition a spring 393 will hold the air supply valve 383 closed. The air starting valve device 382 is of conventional structure, and it will be apparent that the engine will be started by air supplied through the several air starting valve devices to the respective cylinders in a direction determined by which of the astern or ahead cams 379 or 380 is positioned to control said devices.

At each engine there is provided a starting air control valve device 36 for controlling the supply of starting air to the respective starting air pipe or header 34 and the release of starting air therefrom. For the purpose of illustration, each valve device 36 may comprise a casing containing a rotary plug valve 345 arranged to control communication between the respective pipe 34 and a pipe 346 adapted to be supplied, from any suitable source, with compressed air for engine starting. A port 347 in the plug valve 345 is provided for either establishing communication between the respective pipes 34 and 346 or for closing said communication and opening pipe 34 to atmosphere through a port 394 in the casing, in different positions of said plug valve. A lever 37 is provided for turning the plug valve 345 to its different positions. With lever 37 in the position in which it is shown in Fig. 1 of the drawings, the supply of starting air to the respective pipe 34 will therefore be cut off and said pipe will be open to atmosphere through port 394, while upon movement of said lever to a position such as indicated by a dot and dash line 38 starting air will be supplied to said pipe, as will be apparent.

Movement of lever 37 of each of the starting air valves 36 to its different positions may be controlled by a starting control cylinder 39 which is in turn controlled by pressure of fluid in a control pipe 31. Each of the cylinders 39 may comprise, as shown in Fig. 8, a piston 40 having at one side a pressure chamber 41 open to the control pipe 31 and having at the opposite side a non-pressure chamber 42 containing a spring 43 acting on the piston for urging it to the position shown when the respective control pipe 31 is devoid of fluid pressure. Upon supply of fluid under pressure through the control pipe 31 and thus to pressure chamber 41, the piston 40 will move against the opposing pressure of spring 43. The piston 40 is provided with a rod 44, a reduced portion 45 of which extends through a suitable bore in the casing and has its end operatively connected to the end of lever 37 of the respective starting air valve 36. At the junction of the larger and smaller portions of the piston rod 44 is a shoulder 46 arranged to engage the end of the casing for limiting movement of the piston 40 by pressure of fluid provided in chamber 41. With this construction it will be seen that with piston 40 in the position in which it is shown in Fig. 8, which condition will be obtained with chamber 41 open to atmosphere, the respective starting air valve 36 will cut off the supply of starting air to pipe 34, while upon movement of piston 40 by pressure of fluid in chamber 41 to the position in which shoulder 46 on the piston rod engages the casing, the respective air valve 36 will be moved to the position for supplying starting air to the starting air pipe 34.

Each of the engines is provided with a speed governor 50 which may comprise a body 395 arranged to be driven by the cam shaft 360 through the medium of the cam shaft gear 362, a gear 396, shaft 397 and a pair of bevel gears 398. The body 395 carries two governor arms or weights 399 the centrifugal force of which is adapted to act axially on a control shaft 400 in opposition to the pressure of a control spring 401. The pressure of spring 401 is arranged to be varied by operation of a cam 402 which controls the displacement of a spring follower 403 against one end of said spring.

The governor control shaft 400 is connected to one end of a lever 404 which is fulcrumed intermediate its ends on a fixed pin 405. The opposite end of lever 404 is connected to one end of a gear rack 406 which is arranged to operate a gear 407 on the fuel control shaft 368 whereby reciprocation of said rack will turn said shaft.

In operation, when the force of the governor control spring 401 is increased by operation of cam 402, the control rod 400, lever 404 and rack 406 will operate gear 407 to turn the fuel control shaft 368 in a clockwise direction, as viewed in Fig. 16, to thereby adjust the fuel pump 372 to increase the supply of fuel to the engine. As the engine accelerates the centrifugal force of weights 399 will act to move the control shaft 400 and thereby the fuel control shaft 368 in the opposite direction to reduce the fuel supply to the engine, and this action will continue until the centrifugal force of weights 399 balances the adjusted pressure of spring 401, whereby the amount of fuel supplied to the engine will be limited in accordance with the adjusted force of spring 401 and thereby the position of cam 402.

In each governor the cam 402 is mounted on a shaft 408 to which is also connected a lever 51 for adjusting the cam. The lever 51 and cam 402 may have an engine idling position in which they are shown in the drawing and may be adjusted to any position between said idling position and a maximum speed or fuel supply position indicated by a dot dash line 52 for said lever to obtain any selected engine speed.

At each engine the lever of the respective governor 50 is connected to a speed control cylinder 53 arranged to be controlled by fluid under pressure in a pipe 54.

Each of the speed control cylinders 53, may for the purpose of illustration, be identical to the starting control cylinder 39 and thus operative with the respective pipe 54 open to atmosphere to move the connected governor control lever 51 to the engine idling position, and operative upon supply of fluid to said pipe to adjust said lever out of the idling position to a position corresponding to the pressure of such fluid. A certain maximum pressure of fluid in the control pipe 54 will cause operation of each speed control cylinder 53 to move the respective governor control lever 51 to the maximum speed position indicated by the dot and dash line 52, as will be apparent. The control of pressure of fluid in pipe 54 at each of the engines will be hereinafter described.

The fuel control shaft 368 is also movable to a fuel cut-off position, in which it is shown in the drawing as above mentioned. To move shaft 368 to its fuel cut-off position, said shaft is provided with an arm 410 arranged to be engaged by one end of a rod 411. The opposite end of rod 411 is connected by a bell crank 412 and a rod 413 to a lever 414. The lever 414 is mounted on a shaft 415 which is operatively connected to a lever 56 of a fuel cut-off device 55. With lever 56 in a fuel cut-off position in which it is shown in Fig. 1 of the drawings, the rod 411 will be moved into contact with arm 410 and actuate said arm to move the fuel control shaft 368 to its fuel cut-off position, as required to permit stopping of the engine. The lever 56 has a fuel cut-in position indicated by a dot dash line 57 and is operable upon movement to said position to draw the rod 411 away from the arm 410 so as to place the positioning of the fuel control shaft 368 under control of the speed governor 50.

At each engine the fuel cut-off lever 56 is connected for control to a fuel cut-off cylinder 58 which in the present embodiment may be like the cylinders 53 and 39 above described and which is arranged to be controlled through a pipe 59a connected to pipe 59. When fluid under pressure is supplied to pipes 59 and 59a on each engine the respective cylinder 58 will act to move lever 56 of the respective fuel cut-off device 55 to its fuel cut-off position in order to allow stopping of the engine, while upon release of fluid under pressure from said pipes the cylinder 58 will cause movement of said lever to its fuel supply position, indicated by the dot and dash line 57, to allow supply of fuel to said engine.

The present invention resides in means for controlling in proper sequence at each engine, the operation of the reversing control shaft 60 and thus the reversing of the valve timing for the engine; the operation of the starting air control cylinder 39; the speed control cylinder 53, and the fuel cut-off cylinder 58, and means including the brake interlock valve devices 25 and 26 for controlling the braking of the propeller shaft 11, all of which will be presently described in detail.

The system for controlling the starting, stopping, reversing, etc., of the engines 1 and 2 comprises what may be called a maneuvering control device 65 associated with each engine, an operator's or engineer's control valve device 66 associated with each of said maneuvering control devices for individually controlling the respective engine, a remote or pilot's control valve device 67 for controlling in multiple or individually the two engines through the respective maneuvering control devices 65, and a station selector valve device 68 associated with each maneuvering control device 65 for selectively rendering the engines controllable by the respective engineer's control device 66 or by the pilot's control device 67.

The control system further embodies a dual fluid pressure supply system which normally provides an individual supply of fluid under pressure to each of the maneuvering control devices 65 and engineer's control devices 66. This dual fluid pressure supply system embodies a source of fluid pressure, such as may be provided in a storage reservoir 69, and two reducing valve devices 70 and 71 of any suitable structure arranged to supply fluid from this reservoir at a desired reduced pressure through check valves 72 and 73, of identical structure, to pipes 74 and 75 leading to the maneuvering control devices 65 and engineer's control devices 66 associated with engines 1 and 2, respectively. The pilot's control valve device 67 is supplied with fluid under pressure through a pipe 76 connected to pipe 74. The two pipes 74 and 75 are connected by a pipe 77 in which is arranged a cut-off valve device 78. Normally, the cut-off valve device 78 is closed, but in case of failure of the supply of fluid under pressure to either of the pipes 74 or 75, due for example to failure of the respective reducing valve device 70 or 71, said cut-off valve device may be opened so as to supply fluid under pressure to both of said pipes from the reducing valve device still operating, the check valve 72 or 73 preventing back flow of fluid under pressure to a reducing valve device which may fail and thereby the possible loss of such fluid pressure in case the failure would be such as to permit escape of fluid under pressure to the atmosphere.

Individual cut-off valve devices 79, 80 and 81 are provided in pipes 75, 74 and 76, respectively, to cut-off the supply of fluid under pressure to the maneuvering control devices 65 and to the pilot's control valve device 67 in case of failure of said devices or to permit repair thereof without loss of fluid under pressure from the reservoir 69.

The cut-off valve devices 79, 80 and 81 are of identical structure and each may comprise, as shown in Fig. 11 of the drawings which is a horizontal sectional view of the cut-off valve device 79 as seen in Fig. 1, a casing containing a rotary plug valve 348 having an open position in which it is shown in the drawing and which is adapted to be turned by a key 349 (Fig. 1) in a clockwise direction through an arc of 90° to a closed position. The plug valve 348 has a T port 350 adapted in the open position to establish communication between the respective pipes connected to opposite ends of the casing. In the closed position of valve 348, this communication is closed and the T port 350 connects the pipe at the fluid pressure outlet side of the valve device to an atmospheric vent port 351, and this is of particular importance in connection with the cut-off valve devices 79 and 80, as will be later brought out.

Each maneuvering control device 65 comprises (Fig. 2) a bracket 85 upon which is removably mounted a fluid motor 86 for reversing the valve gear or timing of the respective engine, and a timing or interlock valve device 87. Also removably mounted on each bracket 85 is the respective engineer's control valve device 66 and station selector valve device 68.

Each fluid motor 86, which may hereafter be referred to as the reversing motor, comprises a cylinder containing a double acting piston 88 having at one side a pressure chamber 89 and provided with a rod 90 projecting from the opposite side through a pressure chamber 91 and a pressure head 92 to the exterior of the casing. Outside of the pressure head 92 the rod 90 is provided with gear teeth 93a, constituting a rack, in mesh with a gear 61 provided on the reversing control shaft 60 of the respective engine, whereby movement of the piston 88 in its cylinder will operate the gear 61 to turn the reversing control shaft 60. The piston 88 has two operating positions, namely, the position in which it is shown in Fig. 2 of the drawings for positioning the shaft 60 and thereby the cam shaft 360 of the respective engine in its astern direction, and a second position in contact with the pressure head 92 for conditioning shaft 60 to position said cam shaft in the ahead direction. Movement of the piston 88 to the astern position shown in Fig. 2 is arranged to be effected by supplying fluid under pressure to chamber 91 to act on one face of the piston while opening chamber 89 at the opposite face to atmosphere. Movement of piston 88 to its ahead position in contact with the pressure head 92 is arranged to be effected by supplying fluid under pressure to chamber 89 while opening chamber 91 to the atmosphere.

In each maneuvering control device the supply and release of fluid under pressure to and from chamber 89 is controlled by means of an ahead control valve device 93, while the supply and release of fluid under pressure to and from chamber 91 is controlled by means of an astern control valve device 94 both of which devices constitute parts of the interlock valve device 87.

The ahead control valve device 93 in each maneuvering control device comprises a supply valve 95 contained in a chamber 96 and arranged to control flow of fluid under pressure from said chamber to a chamber 97 which is connected to chamber 89 through a passage 98 and a choke 99, and also by way of a check valve 100 by-passing said choke, the check valve being arranged to allow relatively rapid flow of fluid under pressure in the direction toward chamber 89 but to close upon reverse or out-flow of fluid under pressure from said chamber to render the choke 99 effective to control the rate of such out-flow. The chamber 96 containing the supply valve 95 also contains a spring 101 constantly effective on said valve for urging it to its closed position shown.

In each maneuvering control device 65 chamber 96 is open through a passage 102, a chamber 103, passage 104 and a chamber 105 to a passage 106 in the bracket 85. This passage 106 in the maneuvering control device associated with engine 1 is arranged to be constantly supplied with fluid under pressure from pipe 74 by way of the cut-out valve device 80 when the valve device is in its open position, while in the maneuvering control device associated with engine 2 the passage 106 will constantly be supplied with fluid under pressure from pipe 75 with the cut-out valve device 79 in its open position.

The ahead control valve device 93 in each maneuvering control device 65 further comprises a fluid pressure release valve 107 contained in chamber 97 and engaging the end of a stem projecting from the supply valve 95 whereby the two valves are movable in unison. The release valve 107 has a fluted stem slidably mounted in a bore 120 provided in a plunger 108 which in turn is mounted to slide in a bore provided in a bushing 109 extending through a chamber 110 which is in constant communication with the atmosphere through a passage 111, a chamber 112, and a port 113. The lower end of bushing 109 engages a ring seal 114 encircling and having sliding contact with the periphery of plunger 108, while engaging the upper end of said bushing is a similar seal 115 also having sliding contact with the periphery of plunger 108. These seals are held under compression at opposite ends of the bushing 109 and in contact with plunger 108 by a nut 116 and are respectively effective to prevent leakage of fluid under pressure along said plunger from chamber 97 to chamber 110 and from chamber 110 to a chamber 117 into which the plunger 108 extends. The bushing 109 is provided with an annular cavity encircling the plunger 108 and open through a plurality of ports 118 to chamber 110. The plunger 108 is also provided with a plurality of ports 119 establishing communication between ports 118 and bore 120 within the plunger 108.

The plunger 108 is provided in chamber 117 with a head 121 disposed above an annular stop shoulder 122 provided for engagement with said head to limit downward movement thereof, and interposed between this head and the opposite end of chamber 117 is a spring 123 which is under a chosen degree of pressure. A diaphragm follower 124 is secured to the opposite face of head 121 by means of a stud 125 having screw-threaded engagement in a bore extending through said head and into the plunger 108, and mounted in this bore below the stud is a follower 126 having a stem 127 extending through a bore in the plunger and having its end engaging the end of the stem projecting from the release valve 107. An initially compressed spring 128 is interposed between the end of stud 125 and the follower 126 for holding the release valve 107 against movement upon movement of plunger 108 in a direction away from said release valve with the supply valve 95 closed.

The follower 124 engages one side of a flexible diaphragm 129 which has as its opposite side a timing chamber 130. The chamber 130 is connected through a passage 131, a choke 132 and a passage 133 to the respective station selector valve device 68. By-passing the choke 132 is a communication including two check valves 134 and 135, arranged to permit flow of fluid from chamber 130 around the choke 132 at a relatively rapid rate but to prevent flow in the reverse direction, so that inflow of fluid pressure to said chamber may be limited by the flow capacity of choke 132. The check valve 135 is subject to the seating pressure of a light bias spring 136.

With chamber 130 at atmospheric pressure or charged with fluid at a pressure below a certain degree, spring 123 will maintain the diaphragm 124 in contact with a stop 137 and the plunger 108 will be elevated by said spring to a position such as shown in the drawing to allow closing of the fluid pressure supply valve 95 by spring 101 and opening of the release valve 107 under the action of spring 128. When fluid is supplied to chamber 130 at a pressure sufficient to overcome the opposing force of spring 123, the diaphragm 129 will deflect downwardly to an extent limited by contact between plunger head 121 and the annular stop 122. The force of spring 101 against the supply valve 95 exceeds that of spring 128 against the release valve 107, as a result of which, this downward movement of diaphragm 129 and follower 124 and thereby of plunger 108 will be relative to the release valve 107 until said plunger contacts said valve which closes communication between chamber 97 and chamber 110. Further movement of the diaphragm follower will then act through the release valve 107 to open the supply valve 95.

The astern control valve device 94 in each maneuvering control device 65 is structurally identical to the ahead control valve device 93 just described and, briefly, comprises a fluid pressure supply valve 140, a fluid pressure release valve 141 and a flexible diaphragm 142 operatively connected to these valves for controlling same in accordance with pressure of fluid in a control chamber 143 which is connected through a passage 144, a choke 145 and a passage 146 to the respective station selector valve device 68. By-passing the choke 145 is a communication in which are disposed two serially arranged check valves, 147 and 148, to provide relatively rapid outflow of fluid pressure from chamber 143 but to render choke 145 effective to limit inflow. The check valve 148 is subject to the pressure of a light seating spring 149.

In the astern control valve device 94 the supply valve 140 is contained in chamber 96 and is arranged to control flow of fluid pressure from said chamber to a chamber 150 containing the release valve 141. Chamber 150 is connected through passage 151 and a choke 152 to chamber 91 below the reversing piston 88. A communication by-passing choke 152 and containing a check valve 153 is provided to allow relatively rapid inflow of fluid pressure to chamber 91 but to limit outflow of fluid pressure therefrom to a degree controlled by the flow capacity of choke 152. The release valve 141 in the astern control valve device 94 is provided for controlling the release of fluid under pressure from chamber 150 and thereby chamber 91 beneath the reversing piston 88 to chamber 110 and thence to the atmosphere.

The timing and interlock valve device 87 associated with each of the maneuvering control valve devices 65 further comprises a starting control valve device 155 for the respective engine, and a fuel and brake control valve device 156 for controlling the cut-in and cut-off of the fuel supply to the respective engine, and for also controlling the brake associated with the propeller shaft 11.

Both of the control valve devices 155 and 156 in each maneuvering control device 65 are structurally identical to the control valve devices 93 and 94 above described.

The starting control valve device therefore comprises a fluid pressure supply valve 157, a fluid pressure release valve 158 and a flexible diaphragm 159 operatively connected to said valves for controlling same. The supply valve 157 is contained in a chamber 160 which is connected by a passage 161 to the respective station selector valve device 68 and said valve is arranged to control flow of fluid from this chamber to a chamber 162 which is connected to pipe 31 leading to the starting air control cylinder 39 on the respective engine. The release valve 158 of the starting control valve device 155 is contained in chamber 162 and arranged to control a fluid pressure release communication between chamber 162 and chamber 110. The diaphragm 159 is arranged to be controlled by the pressure of a spring 167 and the opposing pressure of fluid in a chamber 163 which is connected through a passage 164 and a choke 165 to a passage 166 in the bracket 85.

A choke 138 is provided in the communication through pipe 31 to the starting air control cylinder 39, and by-passing this choke is a communication containing a check valve 139 this structure providing for restricted flow of fluid under pressure to said cylinder and a faster flow out of said cylinder. On the side of choke 138 connected to the starting air control cylinder is a reservoir 181 connected to pipe 31 which provides a volume at the cylinder side of the choke 138 to permit said choke to be of a practical size.

The fuel and brake control valve device 156 comprises a valve 170, a valve 171 and a flexible diaphragm 172 for controlling said valves in accordance with pressure of fluid effective in a chamber 173 and the opposing pressure of a control spring 169. In the present structure the valve 170 constitutes a release valve which is contained in chamber 112 and which is arranged to release fluid under pressure from a chamber 174 to chamber 112 for flow to the atmosphere through port 113. The valve 171 constitutes a supply valve for controlling supply of fluid under pressure from chamber 103 to chamber 174 which is connected to pipes 59a and 59 leading to the fuel cut-off cylinder 58 and to the brake interlock valve device 25 or 26 associated with the respective engine. Chamber 173 is connected through a communication including two serially arranged check valves 175 and 176 to passage 164, the check valves being arranged to provide for flow of fluid under pressure from said passage to said chamber but to prevent flow in the opposite direction. The check valve 176 is subject to the light seating pressure of a bias spring 177 urging same to its closed position.

The timing and interlock device 87 associated with each maneuvering control device 65 also comprises a double check valve 182 open at opposite ends to passages 178 and 179 connected respectively to chambers 97 and 150 in the ahead and astern control valve devices 93 and 94. The double check valve 182 is arranged to control communication between the two passages 178 and 179 and a passage 180 which leads to chamber 173 above the diaphragm 172 in the fuel and brake control valve device 156. With the double check valve in the position shown it opens communication between passages 180 and 178 and closes communication between passages 180 and 179. In an opposite position the double check valve will open passage 180 to passage 179 and will close communication between passage 180 and passage 178.

In the bracket 85 of each maneuvering control device is a double check valve device 185 comprising a bushing 186 which is encircled midway between its ends by an annular cavity 187 to which is connected passage 166. The bushing 186 is provided interiorly and midway between its ends with a bridge having an axial bore 188 open to chamber 187 through a plurality of radial bores 189. At one end of the axial bore 188 is an annular seat 190 arranged for sealing engagement by a valve 191 contained in a chamber 192, while at the opposite end of said bore is an oppositely arranged annular seat 193 provided for sealing engagement by a valve 194 contained in a chamber 195. The two valves 191 and 194 are connected for movement in unison by a stem 196 loosely extending through the axial bore 188. This stem is of such construction as to allow flow of fluid past either valve 191 or 194, when unseated, to bore 188 for supply to the annular chamber 187.

Chamber 192 is connected to a passage 197 arranged to be connected to chamber 91 below the reversing piston 88 when said piston is in its upper or astern position as shown in the drawing. Chamber 195 is connected to a passage 198 arranged to be opened to chamber 89 above the reversing piston 88 when said piston is in its lower or ahead position in contact with the pressure head 92. A choke 199 is provided in passage 197 to limit flow of fluid pressure through said passage in the direction of chamber 192 in the double check valve device 185, for reasons which will be later described. The flow capacity of choke 199 is however great enough with respect to clearance space which may be provided around the valve 191 to allow flow of fluid past said valve to the axial bore 188, to provide a sufficient differential in fluid pressures on said valve upon said flow to move said valve into contact with seat 190 when chamber 195 containing the check valve 194 is at a pressure slightly exceeding atmospheric pressure. A similar choke 200 is provided in passage 198.

The station selector valve device 68 associated with each of the maneuvering control devices 65 comprises a rotary valve 202 contained in a chamber 275 and having two different control positions, namely a remote control position, in which it is shown in Fig. 2, to provide for control of the respective engine by operation of the pilot's control valve device 67, and a local control position, in which it is shown in Fig. 3, to provide for individual control of the engine by the respective engineer's control valve device 66. A hand operated lever 203 is operatively connected to the rotary valve 202 for turning same to its different positions.

The brackets 85 of the two maneuvering control devices 65 are connected in parallel (Fig. 1) to an ahead control pipe 205, an astern control pipe 206, a starting control pipe 207 and a speed control pipe 208 and all of these pipes are also connected to the pilot's control valve device 67. At each engine, pipe 54 connected to the speed control cylinder 53 is also connected to the respective bracket 85, as well as the fluid pressure supply pipe 74 or 75, as above described.

All of these pipes 205, 206, 207 and 208 and 54, as well as passage 106 in the bracket, which is supplied with fluid under pressure from either pipe 74 or 75, are connected to the seat of the rotary valve 202 in each of the station selector valve devices.

In the remote control position of the rotary valve 202 in each selector device 68, the ahead control pipe 205 is connected by a cavity 209 in said valve to passage 133 leading to the ahead control valve device 93, while the astern control pipe 206 is connected through a cavity 210 in said valve to passage 146 leading to the astern control valve device 94. The starting control pipe 207 is connected through a cavity 211 in said valve to passage 161 leading to the starting control valve device 155, while the speed control pipe 208 is connected by a cavity 212 in said valve to pipe 54 leading to the speed control cylinder 53. In the remote control position of the rotary valve 202 (Fig. 2) the fluid pressure supply passage 106 is connected by cavity 213 in said valve to a passage 214 which leads to chamber 105 in the respective bracket 85, but communication between the latter passage and said chamber may be closed by a removable plug 215 mounted under a pipe plug 216. With the plug 215 located as shown in Fig. 2, the passage 214 and cavity 213 therefore perform no useful function since fluid pressure is supplied to chamber 105 directly from passage 106. The purpose of the communication including the plug 215 in each bracket 85, will be later brought out.

Also connected to the seat of rotary valve 202 in each station selector valve device 68 are passages 205a, 206a, 207a, 208a and 76a. All of these passages are closed by the rotary valve 202 in its remote control position (Fig. 2) except passage 76a which is opened through a cavity 216 in said valve to an atmospheric exhaust port 217.

In the local control position of each rotary valve 202 (Fig. 3) the ends of pipes 208, 206 and 205 are lapped by said rotary valve and the fluid pressure supply passage 106 is connected by a cavity 217a to passage 76a. The ahead passage 133 and astern passage 146 are connected, respectively, by cavities 218 and 219 in the rotary valve to passages 205a and 206a. The starting control passage 161 is connected by a cavity 220 in the valve 202 to passage 207a, while the speed control pipe 54 is connected by a cavity 221 in said valve to passage 208a. In each bracket 85 the passages 205a, 206a, 207a, 208a and 76a all lead to a mounting face 222 on the bracket against which the respective engineer's control valve device 66 is adapted to be removably secured.

As above described the several pipes connected to the brackets 85 of the two maneuvering control valve devices 65 are also connected to the pilot's control valve device 67, such connections being made to a bracket 223 upon which the pilot's control valve device is removably mounted. The passages 205a, 208a, 207a, 206a and 76a opening at the face 222 of each of the maneuvering control device brackets 85 correspond in relative position and in function to those in the bracket 223 of the pilot's control valve device 67, whereby the same control valve device can be used at the pilot's control station and at the engineer's control station at each engine.

In Fig. 4 of the drawings is shown the pilot's control valve device 67 mounted on the bracket 223, and since the engineer's control valve devices 66 are identical, except for the part upon which they are mounted, the following description of the pilot's control device 67 will therefore apply to the engineer's control device 66.

As shown in Fig. 4, the pilot's control valve device 67 comprises a base portion arranged for mounting on the bracket 223 and contains an ahead pilot valve device 224 and an astern pilot valve device 225. Mounted on the base portion is a speed control valve device 226 with which there is associated a starting control valve device 227.

The ahead pilot valve device 224 comprises a fluid pressure supply valve 228 which is contained in a chamber 229 supplied with fluid under pressure from pipe 76 and arranged to control communication between said chamber and a chamber 230 which is connected to the ahead control pipe 205. A spring 236 in chamber 229 acts on valve 228 to seat same. A release valve 231 contained in chamber 230 rests on the end of a fluted stem projecting from the supply valve 228 and has a stem slidably mounted in a bore 233 provided in a plunger 232 which is mounted to slide in the casing. The valve 231 is provided for controlling communication between chamber 230 and bore 233 in the plunger, which bore is open to the atmosphere through a passage 234. A spring 235 in bore 233 acts on the release valve stem for maintaining the release valve in contact with the stem of the supply valve 228 upon movement of the plunger 232 in a direction away from the release valve for opening communication past said release valve. Upon movement of the plunger 232 in the direction of the release valve 231, the spring 236 will maintain the supply valve 228 seated against the pressure of spring 235 acting on the release valve, whereby the plunger will initially move into contact with the release valve for closing communication between chamber 230 and the atmosphere, and will then act through said valve to unseat the supply valve 228. Upon movement of plunger 232 in the opposite direction or away from the release valve, the spring 236 will seat valve 228 followed by movement of plunger 232 out of contact with the release valve 231.

The astern pilot valve device 225 is structurally identical to the ahead pilot valve device 224 comprising a supply valve 237 contained in chamber 229 for controlling communication between said chamber and a chamber 238 which is connected to the astern control pipe 206. A release valve 239 is provided in chamber 238 for controlling communication between said chamber and the atmosphere. A plunger 240 is provided to cooperate with the release valve 239 for controlling operation thereof and of the supply valve 237.

The starting control valve device 227 may also be structurally identical to the ahead run valve device 224 and may therefore comprise a supply valve 242 contained in a chamber 243 which is supplied with fluid under pressure from pipe 76, and which valve is arranged to control flow of fluid from said pipe to a chamber 244 which is open to the starting control pipe 207. The starting control valve device further comprises a fluid pressure release valve 245 and a plunger 246 arranged to cooperate with said valve to control release of fluid under pressure from chamber 244 to the atmosphere.

The speed control valve device 226 may be of any conventional, preferably self-lapping type, such, for example, like that fully disclosed in the copending application of Harry C. May, Serial No. 523,656, filed February 24, 1944, now Patent No. 2,381,222, issued August 7, 1945, and assigned to the assignee of the present application. Briefly, this device comprises a plunger 250 operable upon displacement into the device from a normal position in which it is shown in Fig. 4, to supply fluid to the speed control pipe 208 at a pressure proportional to the degree of such displacement and to release fluid under pressure from said pipe upon movement of the plunger out of the device in accordance with the extent of such movement, and to provide for opening of said pipe to atmosphere when in the normal position shown in Fig. 4.

As viewed in Fig. 4 the plungers 232, 240 and 250 of the ahead and astern pilot valve devices 224 and 225 and of the speed control valve 226 are arranged side by side in spaced relation to move in a vertical direction, while the plunger 246 of the starting control valve device 227 is arranged to move horizontally. For controlling movement of these plungers a shaft 251 is provided which extends over the ends of the plungers of the run control devices 224, 225 and speed control device 226 and parallel to the plunger of the starting control device 227. This shaft is suitably journaled in the casing and carries three cams 252, 253 and 254, the peripheral surfaces of which are arranged for engagement, respectively, with the plungers 232 and 240 of the ahead and astern pilot valve devices 224 and 225, and with one side of one end of an arm 255, the opposite side of which engages plunger 250 of the speed control valve device 226. The other end of arm 255 is fulcrumed on a pin 256 carried by the casing.

The operating shaft 251 is provided with an axial bore in which is slidably mounted a plunger 258 one end of which projects beyond one end of the shaft 251 for connection with one end of a lever 259. The opposite end of lever 259 is fulcrumed on a pin 260 carried by a lug projecting from the casing. Intermediate its ends this lever engages plunger 246 of the starting control valve device 227.

The operating shaft 251 is provided in one side with a slot, and the plunger 258 is provided with an aligned slot 261 and extending into these slots and pivotally mounted on a pin 262 carried in an ear 263 projecting from the shaft 251 is one end of an operator's control lever 264. A pin 265 extending across slot 261 and secured at opposite ends in opposite walls of said slot also extends through a recess provided in the end of the operator's control lever 264. By this construction it will be seen that movement of the operator's control lever 264 about the fulcrum pin 262 lengthwise of the control shaft 251 will shift the plunger 258 longitudinally of said control shaft. Thus movement of the plunger out of the position in which it is shown in Fig. 4 of the drawing will rock the lever 259 in a counterclockwise direction to move plunger 246 into contact with the release valve 245 and then actuate said release valve to open the supply valve 242 of the starting control device 227 for supplying fluid under pressure to the starting control pipe 207, while the return of the operator's lever to the position in which it is shown will operate the plunger 258 and lever 259 to permit closure of the supply valve 242 and the opening of the release valve 245 for releasing fluid under pressure from the starting control pipe 207.

The operator's control device further comprises a cover 268 which is secured to the base portion thereof and which has a slot 269 (Fig. 5) providing for movement of the operator's control lever 264 in a direction about the axis of the control shaft 251 for rocking said shaft. In this slot the operator's control lever 264 may have a "Stop" position intermediate the ends of the slot, and at one or an "Ahead" side of said "Stop" position, a "Full Speed" position and an intermediate or "Run and Idle" position. At the opposite side of the "Stop" position the lever may have an "Astern Full Speed" position and an intermediate or "Run and Idle" position, all of these positions being indicated by legends in Fig. 5. Adjacent the "Ahead Run and Idle" position the cover is provided with another slot 271 to permit lateral movement of the lever out of slot 269 for operating the plunger 258 to effect movement of the starting control valve device 227 for supplying fluid under pressure to the starting control pipe 207. A slot 272, like slot 271, is open to slot 269 adjacent the "Astern Run and Idle" position to also permit lateral movement of the operator's control lever 264 to effect operation of the starting control valve device 227 to supply fluid under pressure to the starting control pipe 207. With the operator's control lever out of slots 271 and 272 and in slot 269, the starting control valve device 227 will be operated to open the starting control pipe 207 to the atmosphere.

The cam 252 provided on the control shaft 251 is operative upon movement of the operator's control lever out of "Stop" position in the direction of the legend "Ahead" (Fig. 5) to effect operation of the ahead pilot valve device 224 to open communication between the fluid pressure supply pipe 76 and the ahead control pipe 205 by the time said lever reaches the "Ahead Run and Idle" position and then to maintain this communication open during further movement to the "Ahead Full Speed" position. In all other positions of the lever 264 the ahead control device 224 will open pipe 205 to the atmosphere. The astern cam 253 is so arranged as to actuate the astern pilot valve device 225 to open the fluid pressure supply pipe 76 to the astern control pipe 206 by the time the operator's control lever obtains "Astern Run and Idle" position upon movement from "Stop" position, and to then maintain this communication open during further movement of the lever to the "Astern Full Speed" position. In all other positions of the operator's control lever the cam 253 permits operation of the astern control valve device 225 to open the astern control pipe 206 to atmosphere.

The cam 254 is provided to control displacement of plunger 250 from its normal position into the speed control valve device 226. With the operator's control lever in "Stop" position the plunger 250 will occupy its normal position, in which position the speed control pipe 208 will be open to atmosphere, and the cam 254 is so designed as to maintain this condition upon movement of said lever to both "Run and Idle" positions. Upon movement of the operator's control lever past either "Run and Idle" position the cam 254 is operative to displace plunger 250 into the speed control device 226 to effect operation thereof for supplying fluid to pipe 208 at a pressure proportional to the extent of such movement, and to provide a maximum pressure of fluid in said pipe in each of the "Full Speed" positions.

In each of the station selector valve devices 68 the rotary valve 202 is arranged to be held seated, against pressure of fluid which may be acting on the seating face thereof through any of the passages or cavities open to said face, by fluid under pressure supplied to chamber 275 through a passage 276 from either the fluid pressure supply passage 106 by way of a check valve 277 or from the ahead or astern control pipes 205 or 206 by way of check valve 278 or 279, respectively, under conditions which will be later brought out. The check valves 277, 278 and 279 are arranged to allow flow of fluid under pressure to chamber 275 but to prevent reverse flow out of said chamber.

*Operation*

In operation, let it be assumed that fluid pressure storage reservoir 69 is supplied with fluid under pressure, that the cut-off valve 78 is in closed position, and that the cut-out valves 79, 80 and 81 are in their open positions. Fluid at the proper reduced pressure will therefore be supplied by the pressure reducing valve device 70 to pipes 74 and 76 leading to the maneuvering control device 65 associated with engine 1 and to the pilot's control device 67, respectively, while at the same time fluid at the same reduced pressure will be provided by the pressure reducing valve device 71 to pipe 75 through which it will flow to the maneuvering control device 65 associated with engine 2. Fluid under pressure thus supplied to each of the maneuvering control devices 65 will flow to passage 106 therein and thence past the check valve 277 and through passage 276 to the rotary valve chamber 275 for holding the rotary valve 202 seated, and at the same time, fluid will also flow from passage 106 through chamber 105 and passage 104 to chamber 103 in the brake and fuel control device 156 and from chamber 103 through passage 102 to chamber 96 containing the fluid pressure supply valves 95 and 140 of the ahead and astern control valve devices 93 and 94, respectively.

Let it further be assumed that lever 203 and thereby rotary valve 202 in each of the selector valve devices 68 is in the remote control position rendering the engineer's control devices 66 ineffective for controlling operation of the respective engines and rendering the pilot's control device 67 effective to control operation of said engines.

Let it also be assumed that the operator's control lever 264 in the pilot's control valve device 67 is in "Stop" position, under which condition the ahead and astern control pipes 205, 206, the starting control pipe 207 and the speed control pipe 208 will all be open to the atmosphere through, respectively, the valve devices 224, 225, 227 and 226. With these pipes thus vented, the parts of the ahead and astern control devices 93 and 94 in each of the maneuvering control devices 65 will be in the positions shown in Fig. 2 opening chambers 89 and 91 at the opposite sides of the respective reversing pistons 88 to atmosphere. It will be further assumed that the engines have been stopped from previously operating in the astern direction under which condition the reversing piston 88 at each engine will be in its astern position as shown in Fig. 2.

With chambers 91 below the reversing pistons 88 at both engines open to atmosphere as above described, diaphragm chambers 163 in the respective starting control devices 155 will also be open to atmosphere through chambers 91 by way of the double check valve devices 185, so that the parts of said control devices will occupy the positions in which they are shown in Fig. 2 for opening the respective starting control pipes 31 to atmosphere, so that the starting control cylinders 39 will condition the starting air valves 36 as shown in Fig. 1 for cutting off the supply of starting air to the starting air pipes or headers 34 at the two engines. The parts of the brake and fuel control valve devices 156 in both maneuvering control devices 65 will also occupy the positions in which they are shown in Fig. 2 since diaphragm chamber 173 in each of the fuel and brake control devices 156 is opened to the atmosphere by way of the respective double check valve 182 and thence through passage 178 and the ahead control device 93. With the brake and fuel control device 156 at each engine in this condition, fluid under pressure will be supplied from the respective chamber 103 to pipes 59 and 59a leading to the fuel cut-off cylinder 58 and to the brake interlock valve device 25 or 26. The fuel cut-off cylinder 58 on each engine will thereby be operated to actuate the fuel cut-off device 55 to cut off the supply of fuel to the respective engine, so that the engine will be stopped.

With the clutch levers 6, associated with the two engines, in their engaged positions in which they are shown in the drawing the brake interlock valve devices 25 and 26 will be opening communication between the respective pipes 59 and pipes 23 and 24, so that fluid under pressure will be effective through one or the other of pipes 23 or 24 and pipe 19 in the brake control relay valve device 18 for operating same to supply fluid under pressure to the brake cylinder device 16. The brake cylinder device will thereby be operated to actuate the levers 15 and 14 to force the brake shoes 13 into braking engagement with the brake drum 12 for holding the propeller shaft 11, the engine drive shaft 3 and the two engines against rotation.

*Starting and running engines to propel ship ahead*

Let it be further assumed that the system is applied for controlling propulsion of a ship and that the pilot now desires to start both engines 1 and 2 for moving the ship forwardly or in ahead direction. To accomplish this the pilot will move lever 264 of control device 67 out of "Stop" position to the "Ahead Run and Idle" position. He may stop such movement in the "Ahead Run and Idle" position until after the engine is conditioned for operating in the ahead direction in a manner which will be presently described and then move the lever 264 to "Ahead Start" position in slot 271, or if desired, he may move the lever directly from "Stop" position to the "Ahead Start" position.

Let it be assumed however that he initially moves the lever from "Stop" position merely to the "Ahead Run and Idle" position adjacent the start slot 271. This movement of the pilot's control lever 264 will rotate the shaft 251 and thereby cam 252 for actuating the ahead pilot valve device 224 to supply fluid under pressure to the ahead control pipe 205 while maintaining the astern control pipe 206 and starting control pipe 207 open to the atmosphere through the respective control valve devices 225 and 227.

Fluid under pressure thus supplied to the ahead control pipe 205 will flow to each of the maneuvering control devices 65 and therein be transmitted through cavity 209 in the selector rotary valve 202 to passage 133 leading to the respective ahead control valve device 93. When the pressure of fluid thus obtained in chamber 130 and acting on one side of diaphragm 129 in each of the ahead control valve devices 93 is increased to a degree sufficient to overcome the opposing force of spring 123, said diaphragm will deflect to close the respective release valve 107 and open the supply valve 95 for supplying fluid under pressure from chamber 96 to chamber 97.

In each maneuvering control device, fluid under pressure then flows from chamber 97 through passage 98 and past the check valve 100 to chamber 89 above the reversing piston 88. At this time chamber 91 below the reversing piston 88 is open to the atmosphere through choke 152, passage 151 and past the release valve 141 in the respective astern control valve device 94, so that the pressure of fluid provided in chamber 89 is rendered effective to move the reversing piston 88 downwardly from its astern position in which it is shown in Fig. 2 to its ahead position in contact with pressure head 92, which movement reverses the cam shaft 360 or valve timing of the respective engine to provide for starting and running of the engine in its ahead direction.

As the reversing piston 88 at each engine is moving from its astern position to its ahead position as just described, the air in chamber 91 is displaced through choke 152 to atmosphere by way of the astern control device 94, and at the same time a portion of said air is also displaced into passage 198 leading to the double check valve device 185. This displacement however is restricted by choke 152 in the communication to the astern control device 94 and by choke 200 into passage 198, so that movement of the piston 88 in the direction of the pressure head 92 will create a certain back pressure in chamber 91 to oppose or dampen such movement so as to prevent sudden movement or slamming of the piston to its ahead position into contact with the pressure head 92.

At the same time as fluid under pressure is supplied from the ahead control valve device 93 to chamber 97 and thence to chamber 89 above the reversing piston 88 in each maneuvering control device 65, fluid from chamber 97 will also flow through passage 178 to the upper end of the double check valve 182 and move said check valve to the position in which it is shown in the drawing in case it is not already in such position, whereupon fluid will flow past said check valve to passage 180 and thence to chamber 173 above the diaphragm 172 in the respective brake and fuel control valve device 156. When the pressure of fluid thus obtained in diaphragm chamber 173 is increased sufficient to overcome the opposing pressure of spring 169 the diaphragm will move downwardly to close the supply valve 171 and to open the release valve 170, whereupon fluid under pressure will be released from pipes 59 and 59a and the respective fuel cut-out cylinder 58 to permit operation of said cylinder to move lever 56 of the fuel control device 55 to its fuel supply position indicated by the dot and dash line 57. This release of fluid under pressure from pipe 59 at both engines will also permit release of fluid under pressure from pipes 23 and 24 through the respective brake interlock valve devices 25 and 26 and thereby from the brake control relay valve device 18 which will then operate to effect a release of the brake on the propeller shaft 11, in order that the propeller may be turned by the engine upon the running thereof.

As the reversing piston 88 in each of the maneuvering control devices 65 is moved from its astern position to its ahead position, the passage 197 is opened to the chamber 89 after a certain slight movement of the piston out of the astern position, whereupon fluid supplied to chamber 89 for moving the piston 88 will flow to said passage and thence to chamber 192 in the double check valve device 185. The pressure of fluid thus provided in chamber 192 and effective on the check valve 191 will then move said valve into contact with the seat rib 190 against opposing pressure of fluid which may be effective in chamber 195 on the check valve 194, and which opposing pressure will substantially equal that provided in chamber 91 by movement of piston 88. At substantially the time the reversing piston 88 attains its ahead position in contact with the pressure head 92, the passage 198 will be opened to chamber 89 above said piston, whereupon fluid effective in said chamber will flow to passage 193 and thence to chamber 195 in the double check valve device 185. Fluid thus provided in chamber 195 will then flow past the unseated check valve 194 to passage 166 and thence through choke 165 and passage 164 to chamber 163 above diaphragm 159 in the starting control valve device 155. When a sufficient pressure is thus obtained in chamber 163 to overcome the opposing pressure of control spring 167 the diaphragm 159 will deflect to close the respective release valve 158 and open the supply valve 157.

The opening of valve 157 in each maneuvering control device 65 as just described will, however, be without effect at this time since chamber 160, which is connected to the starting control pipe 207, is open to the atmosphere by way of the starting control valve device 227 in the pilot's control valve device 67 with the pilot's control lever 264 in the "Ahead Run and Idle" position adjacent to but out of the start slot 271. Movement of the pilot's control lever 264 into slot 271 will however operate the starting control device 227 to supply fluid to the starting control pipe 207 and thence to chamber 160 in the starting control valve device 155 in both maneuvering control devices. In each maneuvering control device the fluid thus supplied to chamber 160 will then flow past valve 157 in the starting control device 155 to pipe 31 and thence through choke 138 to the respective starting cylinder 39. When the pressure of fluid in the cylinders 39 is then increased to a sufficient degree, said cylinders at both engines will operate the starting air valves 36 to supply starting air to pipes 34 from which it will flow through the different pipes 35 to the engine cylinders for causing the air rotating valve devices 382 at the engines to start turning in the direction determined by the engine valve gearing including the engine cam shafts as adjusted by the respective reversing pistons 88. With the fuel control devices 55 adjusted as above described to supply fuel to the engines, such fuel will be provided or injected as the engines are placed in motion by the starting air from pipes 34 and will thus be effective to cause the engines to immediately fire and run in the selected direction.

After the engines are thus placed in motion and are running on fuel supplied thereto, the pilot will move his control lever 264 out of slot 271 to the "Ahead Run and Idle" position to operate the starting control device 227 to release fluid under pressure from the starting control pipe 207 and thereby from pipes 31 and the starting air cylinders 39 on both engines, whereupon said cylinders will operate the respective starting valves 36 to cut off the supply of starting air to pipes 34 and to open said pipes to atmosphere. With the pilot's control lever 264 in the "Ahead Run and Idle" position conditioning the speed control device 226 to open the speed control cylinder 53 at both engines to atmosphere, the engines will then continue to run on fuel at an idling speed.

The pilot may now accelerate the two engines in unison to any desired speed above idling by suitable adjustment of the control lever 264 between the "Ahead Run and Idle" position and the "Ahead Full Speed" position for supplying fluid to the speed control cylinders 53 at a pressure to provide corresponding adjustment of the governor control levers 51 at the two engines, as will be apparent.

In the operation above described it will be noted that in each maneuvering control device 65 the supply of fluid under pressure from chamber 89 above the reversing piston 88 through the double check valve device 185 for operating the starting control device 155 is retarded by choke 165 in passage 166, as well as by choke 200 in passage 198. One purpose of choke 200 has hereinbefore been described, but this choke is also effective with choke 165 to delay obtaining sufficient pressure on diaphragm 159 in the starting control device 155 for opening the supply valve 157 for a certain relatively short period of time, such as two seconds, after passage 198 is opened to chamber 89 above the reversing piston 88, in order to insure movement of said piston into contact with pressure head 92 and thus insure a complete reversal of the valve gear cam shaft 360 of the respective engine before the starting control device 155 can operate to supply fluid under pressure for causing operation of the starting air cylinders 39 on the two engines for supplying starting air to the engines. It will be apparent that this delayed operation of the starting control device 155 at each engine would not be necessary if the operator in starting the engine would merely move the control lever 264 to "Ahead Run and Idle" position and allow it to remain there until after the operation of the reversing piston 88 had been completed. However, it is more desirable to allow the operator to move the control lever 264 directly to the "Start" position without hesitation in the "Run and Idle" position, and under this condition the chokes 200 and 165 insure complete reversal of the engine's valve gear before starting air is supplied to the engine to place the engine in motion.

*Reversal of engines to reverse movement of ship from ahead to astern*

Now let it be assumed that, with the ship being propelled in the ahead direction under the power of both engines 1 and 2, the pilot desires to reverse the direction of movement of the ship under the power of both engines. To accomplish this he will move lever 264 in the control device 67 from whatever position it may occupy between the "Ahead Run and Idle" and "Ahead Full Speed" positions to the "Astern Run and Idle" position and then, if desired, directly into the astern starting slot 272.

This operation of the pilot's control lever 264 will actuate the ahead pilot valve device 224 to open the ahead control pipe 205 to atmosphere and at substantially the same time will actuate the reverse pilot valve device 225 to open the reverse control pipe 206 to a chamber 229, so that fluid under pressure will be supplied to the latter pipe. This operation of the pilot's control lever 264 will also effect operation of the speed control device 226 to open the speed control cylinders 53 at the two engines to atmosphere for releasing fluid under pressure from said cylinders to allow movement of the governor control arms 51 to their engine idling positions and at the same time will also actuate the starting control device 227 to supply starting air to the starting control pipe 207.

The release of fluid under pressure from the ahead control pipe 205 by movement of the pilot's control lever 264 to the "Astern Start" position in slot 272 will result, at both engines, in prompt release of fluid under pressure from chamber 130 in the ahead control valve devices 93 by way of the check valves 134 and 135 by-passing the choke 132, whereupon in both of said devices the supply valves 95 will close and the release valves 107 will open for releasing by way of choke 99 fluid under pressure from chamber 89 above the respective reversing pistons 88. At the same time, fluid under pressure will also be released in each maneuvering control device 65 from diaphragm chamber 173 of the brake and fuel control device 156 by way of passage 180, past the double check valve 182, through passage 178 and chamber 97. Fluid under pressure will also be released from diaphragm chamber 163 in the starting control device 155 by way of passage 164, past the two check valves 175 and 176 and thence by way of chamber 173 and passage 180. In each maneuvering control device 65, the choke 99 restricts the rate of release of fluid under pressure from the reversing piston chamber 89 but there is no restricting means in the release communication from diaphragm chambers 173 and 163 of the brake and fuel control device 156 and starting control device 155, and moreover, choke 165 restricts flow of fluid under pressure to said chambers from the reversing piston chamber 89. As a result, promptly upon movement of the pilot's control lever to the "Astern Start" position in slot 272, the fuel and brake control device 156 at each engine will operate to supply fluid under pressure to the respective pipe 59, for cutting off the supply of fuel to the engine and for applying the brake to the propeller shaft 11, and the starting control device 155 at each engine will also operate to close communication between the starting control pipe 207, which is supplied with fluid under pressure from the pilot's control device in the "Ahead Start" position and the starting pipe 31, and will open the latter pipe to atmosphere past check valve 139 to prevent starting air being supplied to the engine during reversing operation.

Fluid under pressure supplied to the astern control pipe 206 upon movement of the pilot's control lever 264 to the "Astern Start" position in slot 272 will flow to each of the maneuvering control devices 65 and thence through passage 146 and choke 145 to chamber 143 in the respective astern control device 94. The choke 145 at each astern control device 94 is effective to delay obtaining sufficient pressure in chamber 143 on diaphragm 142 to deflect said diaphragm against the opposing force of the control spring for a period of time sufficient for the engine to be substantially stopped by operation of the brake on the propeller shaft, following which the pressure in chamber 143 will deflect the diaphragm 142 downwardly to close the respective release valve 141 and open supply valve 140. The opening of the supply valve 140 in the astern control device 94 of each maneuvering control device will supply fluid under pressure to chamber 150 from which it will flow in one direction through passage 151 and past check valve 153 to chamber 91 below the reversing piston 88. Since chamber 89 above the reversing piston is at this time open to atmosphere through the ahead control device 93 the pressure of fluid thus obtained in chamber 91 will move the reversing piston 88 from the ahead position in contact with pressure head 92 back to its astern position shown in Fig. 2, the chokes 199 and 99 being effective during this movement to retard displacement of air from chamber 89 in the same manner and for the same purpose as chokes 200 and 152 act upon movement of the reversing piston to its ahead position, as hereinbefore described.

At the same time as fluid under pressure is applied from the astern control device 94 through chamber 150 to chamber 91 in each of the maneuvering control devices, fluid pressure will also flow from said chamber 150 through passage 179 to the lower end of the double check valve 182 and move said check valve to its upper position, since passage 178, open to the opposite end of the check valve, is at this time open to atmosphere through the respective ahead control valve device 93. In the upper position of the double check valve 182 fluid under pressure will then flow from passage 179 to passage 180 and thence to diaphragm chamber 173 in the brake and fuel control valve device 156 to cause operation of said device to release fluid under pressure from pipe 59 on the respective engine to permit operation of the fuel control cylinder 58 to return the fuel cut off device 55 on said engine to its fuel cut-in position. This release of fluid under pressure from pipe 59 at the two engines will also permit release of the brake on the propeller shaft 11.

It will be noted that since, in each maneuvering control device, the astern control valve device 94 is prevented from operating to supply air to chamber 91 for reversing the piston 88 until after the engine has been substantially stopped, as above described, the fuel and brake control device 156, as controlled by said astern control device, will maintain the supply of fuel to the engine cut-off until after the engine has been substantially stopped and then operate to permit a resupply of fuel to the engine.

In each maneuvering control device, movement of the reversing piston 88 from its ahead position in contact with pressure head 92 to its astern position shown in Fig. 2, will first open passage 198 to chamber 91 so that fluid under pressure will flow from said chamber to chamber 195 in the double check valve device 185, and this pressure acting on the check valve 194 will move same into contact with its seat 193 and thus move the check valve 191 out of engagement with its seat 190. When the reversing piston 88 then attains its astern position, fluid will be supplied from chamber 91 to passage 197 and this fluid will flow past the check valve 191 in the double check valve device 185 to passage 166 and thence through choke 165 to chamber 163 above diaphragm 159 in the starting control valve device 155. At this time the choke 165 acts in the same capacity as before described to delay obtaining sufficient pressure in chamber 163 to deflect diaphragm 159 against spring 161 for a period of time sufficient to insure complete movement of the reversing piston 88 to its astern position shown in Fig. 2. Upon expiration of this time period, the pressure in chamber 163 will then deflect diaphragm 159 to close the release valve 158 and open the supply valve 157. With the supply valve 157 of the starting control valve device 155 thus open, fluid under pressure supplied to the starting control pipe 207 by way of the pilot's control device 67 in its "Astern Start" position will flow to the starting pipe 31 to thereby effect operation of the starting air cylinder 39 and starting air valve device 36 to supply starting air to the starting pipe 34 on the respective engine. The two engines will then be placed in motion by the starting air supplied to the respective pipes 34, and since the fuel control devices 55 on the engines were previously conditioned for supplying fuel to the engines, the engines, after being placed in motion by starting air, will fire and run on fuel.

After the two engines have been thus started and are running on fuel, the pilot will move his control lever 264 out of the slot 272 back to "Astern Run and Idle" position to release fluid under pressure from the starting air cylinders 39 at the two engines for thereby cutting off the supply of starting air to the engines. The pilot may then adjust his control lever 264 in the direction of the "Astern Full Speed" position as required for accelerating the two engines to provide the desired rate of movement of the ship in the astern direction.

*Reversal of engines to reverse movement of ship from astern to ahead*

If the operator should now desire to reverse the direction of movement of the ship from the astern direction under the power of both engines to the ahead direction under the power of both engines he will move the control lever 264 from the position in slot 269 which it may occupy between the "Astern Full Speed" position and the "Astern Run and Idle" position to the opposite side of "Stop" position and then, if desired, immediately into the starting slot 271. The two maneuvering control devices 65 will then operate in unison in response to this operation of the pilot's control lever 264 to cut off the supply of fuel to both engines, to cause operation of the brake on the propeller shaft to stop said engines, and to close off the supply of starting air to the engines. Then after the engines have been brought to a stop, the two maneuvering control devices will supply fluid under pressure to chambers 89 above the reversing pistons 88 to effect reversal of the valve timing or gear in both engines and at substantially the same time, will release the brake on the propeller shaft and cause operation of the fuel control devices 56 at both engines to again supply fuel to the engines, and after the valve gear or timing of both engines has been reversed, the maneuvering control devices will supply starting air to both engines for causing starting and running thereof in the new direction, in a manner which will be apparent from the above description of the operation of the apparatus in response to movement of the pilot's control lever to reverse the direction of operation of the engines from ahead to astern.

It is desired to point out that in reversing the direction of operation of the engines from astern to ahead, the choke 132 in both maneuvering control devices acts in the same capacity as choke 145 upon reversing the direction of operation of the engines from ahead to astern, i. e., to prevent operation of the reversing pistons 88 to reverse the valve gear or timing in the respective engines, until after the engines have been substantially stopped.

*Stopping of engines*

In order to stop the engines from either direction of operation the pilot need only move the control lever 264 back to "Stop" position in which both the ahead and astern control pipes 205 and 206 are opened to the atmosphere. The ahead or astern control valve device 93 or 94, whichever was last effective in the two maneuvering control devices 65 to determine the direction of operation of the engines, will then operate upon the release of fluid under pressure from the respective control pipes 205 or 206, to release actuating fluid pressure from the respective reversing piston chambers 89 or 91 and from chamber 173 in the respective fuel and brake control device 156. The parts of the fuel and brake control device 156 in both maneuvering control devices will then return to the positions in which fluid under pressure will be supplied to pipe 59 on each engine to operate the cylinder 58 to actuate the fuel cut-off device 55 to its fuel cut-off position to allow stopping of the engines. Fluid pressure thus provided in pipes 59 on the engines will also flow to the brake interlock valve devices 25 and 26, and with the clutch control levers 6 in their engaging positions, fluid under pressure will flow through said devices to pipes 23 and 24 and from one or the other of pipes 23 or 24 through the double check valve device 22 to effect operation of the brake relay valve device 18 to apply the brake to the propeller shaft 11 for bringing the two engines to a stop.

*Starting and running engines to propel ship astern*

With the engines stopped, the starting and running thereof to cause movement of the ship in the astern direction may be effected by movement of lever 264 of the pilot's control device 67 from "Stop" position into slot 272 and then back to the "Astern Run and Idle" position and subsequent adjustment thereof in the direction of the "Astern Full Speed" position, as will be readily apparent from the above description.

*"Flash" reversal of engines*

As hereinbefore described, upon movement of an operator's control lever 264 from a position between either "Run and Idle" and the adjacent "Full Speed," in which position the starting air control cylinder 39 on the engine or engines is open to atmosphere, to the "Start" position at the opposite side of "Stop," the starting control valve device 227 in the operator's control device is operated to supply fluid under pressure to the starting control pipe 207. If this movement of the operator's control lever is at what may be called a normal rate, then the pressure of fluid in diaphragm chamber 163 in the starting control valve device 155 in the maneuvering control device or devices 65 will become sufficiently reduced to allow closing of its supply valve 157 before the fluid under pressure supplied to the starting control pipe 207 can become effective past said valve to effect operation of the starting air control cylinder 39 on the engine or engines to supply starting air to the starting pipe 34.

Thus the supply of starting air to the engine or engines will be prevented until after reversing movement of the respective reversing piston 88 has been completed to condition the valve gear for starting of the engine in the reverse direction. However, it is possible for an operator to move the control lever 264 so rapidly (flash movement) to effect reversal of the engine or engines, that a sufficient pressure of fluid may be obtained past the supply valve 157 in the starting control device 155 before closing of said valve (without the use of choke 138) to cause operation of the starting air control cylinder 39 in the engine or engines to supply starting air to the starting pipe 34 before the reversing piston 88 had completed its reversing stroke, and this is considered objectionable.

To avoid obtaining the objectionable operation just described, the choke 138, check valve 139 and reservoir or volume 181 are associated with pipe 31 at each engine. The choke 138 is provided to so retard flow of fluid under pressure from the starting control pipe 207 through pipe 31 to the respective starting air control cylinder 39 as to prevent obtaining sufficient pressure therein to actuate said cylinder to supply starting air to the engine, before operation of the respective starting control device 155 to open said cylinder to atmosphere, in response to "flash movement" of the operator's control device, above described. With this structure it will therefore be seen that regardless of the rapidity of movement of the operator's control lever 264 to reverse the engine or engines, starting air will not be supplied to the engine until after the intended and above described reversal of the engine's valve gear or timing has been assured.

It will be apparent that the reservoir 181 merely increases the volume for receiving fluid pressure supplied through choke 138 and hence permits use of a larger size of choke than could be used without the reservoir. This reservoir is of small volume, and in practice the equivalent of the reservoir might be obtained by increasing the length or size of the pipe between choke 138 and the respective starting air control cylinder 39.

The check valve 139 is provided to render the choke 138 effective to limit rate of flow of fluid under pressure as above described, and is operable to permit a faster rate of release of fluid under pressure from the respective starting air control cylinder, as will be apparent.

At each engine the size or flow capacity of choke 138 required to prevent the objectionable operation above described will result in delaying the intended operation of the starting air control cylinder 39 in response to reversal of the reversing piston 88 to supply air to pipe 34 for starting the engine, as compared to operation without the choke. This delay will be relatively short in degree but may be entirely avoided by the use of a structure such as shown in Fig. 12 of the drawings, and which structure will also avoid the above described objectionable operation. The structure shown in Fig. 12 will now be described.

DESCRIPTION AND OPERATION—FIG. 12

According to this modification the choke 138, check valve 139 and volume 181 for each engine may be dispensed with and a starting and reversing interlock valve device 282 substituted for controlling communication through the respective pipe 31.

The interlock valve device 282 at each engine may comprise two oppositely seating coaxially arranged abutting poppet valves, 283 and 284, which are contained in a chamber 285 open to the portion of pipe 31 that is connected to the respective starting air control cylinder 39. The valve 283 controls communication between chamber 285 and a chamber 286 which is connected to the portion of pipe 31 leading to the respective maneuvering control device 65. The valve 284 is arranged to control release of fluid under pressure from chamber 285 and from the starting air control cylinder 39 to a chamber 287 which is open to atmosphere. A spring 287 in chamber 286 acts on valve 283 to open same, and acts through the medium of said valve on valve 284 to close the latter. A piston 288 connected to valve 284 and having one side open to the atmosphere through a breathing passage 289, has at the opposite side a chamber 290 open to a control pipe 291. With chamber 290 relieved of fluid under pressure, the valve 283 will be open and the valve 284 closed to permit the same rate of flow of fluid under pressure through pipe 31, to actuate the respective starting air control cylinder 39, as would be obtained in the structure shown in Fig. 2 of the drawings with the choke 138 omitted. When fluid is provided in chamber 290 at a pressure sufficient to overcome the pressure of spring 287, the piston 288 will act to open valve 284 and close valve 283 to thereby prevent flow of fluid under pressure to and to actually open the starting air control cylinder 39 to atmosphere.

The supply of fluid under pressure to and its release from piston chamber 290 by way of pipe 291 is arranged to be controlled by a double check valve device 293 associated with the respective maneuvering control device 65. This check valve device may be identical in structure and operation to the double check valve device 185 in the bracket 85 of the maneuvering control device, and as shown diagrammatically comprises a casing having two chambers 294 and 295 connected by a bore 296 to which is connected the pipe 291. A check valve 297 is disposed in chamber 294 for controlling communication between said chamber and bore 296, while a check valve 298 disposed in chamber 295 is arranged to control communication between chamber 295 and said bore. The two check valves are connected by a stem 299 loosely extending through the bore 296, said stem being of such length as to allow seating of either one of the valves, but not of both at the same time.

The check valve chamber 294 is connected to passage 133, and the check valve chamber 295 is connected to passage 146, it being noted that those connections are made to the same passages through which fluid under pressure is supplied to diaphragm chambers 130 and 143 of the ahead and astern control valve devices 93 and 94, respectively, but ahead of the respective chokes 132 and 145.

In operation, let it be assumed that the engines are operating to propel the ship ahead. Under this condition, the ahead control pipe 205 will be supplied with fluid under pressure and the astern control pipe 206 will be open to the atmosphere. The pressure of fluid from the ahead control pipe 205 is thus effective in passage 133, and this pressure in chamber 294 acting on check valve 297 will seat said check valve and unseat the check valve 298. With the check valve 298 unseated, pipe 291 will be connected to the vented astern control pipe 206, so that spring 287 in the interlock valve device 282 will close valve 284 and open valve 283 for opening communication through pipe 31 to the starting control cylinder 39. With the ship being propelled ahead and the operator's lever 264 out of the "Ahead Start" position, the starting control pipe 207 and thus pipe 31 will be open to atmosphere as previously described.

Now let it be assumed that the operator desires to reverse the direction of movement of the ship and to accomplish such reversal imparts "flash movement" to his control lever 264 into the "Astern Start" position. This will release fluid under pressure from the ahead control pipe 205 and thus from chamber 294 in the double check valve device 293, and substantially simultaneously, fluid under pressure will be supplied to the astern control pipe 206, and also to the starting control pipe 207. In the double check valve device 293, the check valve 298 will be held open by the reducing pressure of fluid in the ahead control pipe 205 acting on the check valve 297 until such pressure becomes reduced to below the increasing pressure of fluid in the astern control pipe 206 which is effective in chamber 295. Thus, immediately upon supply of fluid under pressure to the astern control pipe, such fluid will flow past the check valve 298 to pipe 291 and thence to piston chamber 290 in the respective starting control valve device 282, and when such pressure, effective on piston 288 is increased to a degree sufficient to overcome the opposing force of spring 287, said piston will act to open valve 284 and close valve 283. In each of the interlock devices 282, the piston 288 may be thus operated by fluid at a relatively low pressure, such as ten pounds, which pressure will be quickly obtained. This low pressure is effective to close valve 283 before sufficient fluid pressure can be obtained from the starting control pipe 207 past said valve to cause operation of the respective starting cylinder 39 to supply starting air to the engine.

When the pressure of fluid in the astern control pipe 206, acting in chamber 295 of the double check valve device 293, is increased to a certain degree over the reducing pressure of fluid in the ahead control pipe 205 effective in chamber 294, the former pressure acting on the check valve 298 will seat same and unseat the check valve 297, whereupon fluid under pressure will be released from pipe 291 and the respective piston chamber 290 along with the final release of fluid under pressure from the ahead control pipe. When the pressure of fluid in piston chamber 290 is thus sufficiently reduced, the spring 287 will open valve 283 and close valve 284, but this will not occur until after operation of the starting control device 155 to close communication between the starting control pipe 207 and pipe 31, which operation of the starting control device will occur promptly upon the release of fluid under pressure from the ahead control pipe 205 as hereinbefore described.

With valve 283 at each starting control valve device 282 thus open, communication will be opened through pipe 31 so that as soon as the reversing piston 88 has completed its reversing operation, fluid under pressure will be supplied to the respective starting air control cylinder 39 to actuate same to supply starting air to the engine to cause starting thereof.

It will be noted that with the valve 283 open there is no means which acts like choke 138 in the structure shown in Fig. 2 to retard flow of fluid under pressure to the starting cylinder 39, so that the structure shown in Fig. 12 eliminates the delay incident to use of choke 138.

Upon "flash movement" of an operator's control lever 264 from the "Ahead" side of "Stop" to "Astern Start," the operation of the apparatus to ensure against supply of starting air to the engine or engines until after reversing of the engines valve gear has been assured, followed by the prompt supply of air upon completion of such reversing, will be readily apparent from the above description of "flash" reversing movement to the "Ahead Start" position.

Under what has been called normal rate of reversing movement of an operator's control lever 264, the structure shown in Fig. 12 will operate the same as on "flash movement," but there is no need for such a structure, or even of the choke 138 and check valve 139 shown in Fig. 2, for the normal rate of movement, as before mentioned.

DESCRIPTION AND OPERATION—FIGS. 13 AND 14

In reversing the operation of the engines as above described, it will be noted that in each maneuvering control device 65, the fuel and brake control device 156 operates to permit supply of fuel to the respective engine and a release of the brake on the propeller shaft upon operation of either the ahead control device 93 or astern control device 94 to effect reversing movement of the reversing piston 88, or in other words, the fuel is resupplied to the engine before the engine's valve gear has been reversed to provide for operation of the engine in the reverse direction, and this is satisfactory if the engine has actually been stopped. However, it is not desirable to resupply fuel to the engines prior to or during operation of the reversing piston 88 before the engines have stopped, as might occur with the structures shown in Figs. 1 and 2 in case of failure or reduced effectiveness of the propeller shaft brake. Neither is it desirable that the brake be released before the propeller has been substantially stopped, as also might occur in case of reduced brake effectiveness. These two possible undesired operations may however be avoided by the structures shown in Figs. 13 and 14 of the drawings, which will now be described.

In Fig. 13 of the drawings the reference numeral 302 indicates a fuel cut-off cylinder device which may be used at each engine in place of the fuel cut-off cylinders 58 shown in Fig. 1. The cylinder device 302 comprises a casing containing a piston 303 having a piston rod 304 projecting from one face for connection with lever 56 of the fuel cut-off device 55. Encircling rod 304 is a precompressed spring 305 which bears against one face of piston 303. At the opposite face of piston 303 is a pressure chamber 306 connected to pipe 59a.

The piston rod 304 is provided with a notch 304a arranged to receive the end of a latch 307 in an inner fuel cut-off position of the piston 303. This latch projects from one side of a piston 308 through a pressure chamber 309 which is connected to the starting pipe 31. At the opposite side of piston 308 is a non-pressure chamber containing a precompressed spring 310 acting on the piston for urging the latch into contact with the rod.

In operation, when a reversal of the engine is initiated, the fluid pressure supplied to pipe 59 will apply the brake on the propeller shaft and also flow to piston chamber 306 and move piston 303 and rod 304 to an inner or fuel cut-off position for actuating lever 56 of the fuel cut-off device to cut off the supply of fuel to the engine. In this inner position of rod 304 the notch 304a therein is aligned with latch 307 which is moved into said notch by spring 310 against whatever pressure of fluid may be effective in the starting control pipe 31 at this time. Upon subsequent supply of fluid under pressure to the respective reversing piston 88 to effect reversal of the engine's valve gear, fluid under pressure will be released from pipe 59 as before described, and a release of fluid under pressure from piston chamber 306 will also occur, but unlike the structure shown in Fig. 1, the fuel cut-off cylinder device 302 will not operate to resupply fuel to the engine at this time due to latch 307 holding the rod 304 and piston 303 in the fuel cut-off position. However, after operation of the reversing piston 88 has been completed, and fluid under pressure is supplied to pipe 31 to effect a supply of starting air to the engine, fluid will also flow from said pipe to the latch piston chamber 309 and move piston 308 against the opposing pressure of spring 310, and this movement will pull the latch 307 out of notch 304a in rod 304. Spring 305 will then actuate the piston 303 and rod 304 to turn lever 56 of the fuel cut-off valve 55 back to the position shown in the drawing for resupplying fuel to the engine.

It will now be seen that the structure shown in Fig. 13 will cut off the supply of fuel to the engine immediately upon initiating a reversal of engine operation, and then maintain the fuel cut off until after the valve gear has been reversed, following which, the fuel will be automatically resupplied to the engine. The piston 308 and spring 310 may be so proportioned as to permit the resupply of fuel to the engine at substantially the same time as the starting cylinder 39 operates to supply starting air to the engine, or if desired, to delay the resupply of fuel for an interval of time after starting air has been supplied to the engine. If the engine is still turning upon the supply of starting air or of both starting air and fuel, the effect of such supply will be to promptly stop the engine and restart it in the reverse direction, as determined by the reversed valve gear.

The modification shown in Fig. 14 merely comprises a choke 311 placed in the brake cylinder exhaust passage 21 of the relay valve device 18 to provide for a gradual release of fluid under pressure from the brake cylinder device 16 and thus a gradual reduction in effectiveness of the brake on the propeller shaft. The choke 311 may be of such size as to maintain the brake effective, under a condition where reversing of the engine might occur prior to stopping thereof such as above described, for a period of time equal substantially to that required for operating the reversing piston 88 to reverse the valve gear and to then cause operation of the starting air control device 36 to supply starting air to the engine, so as to thereby obtain maximum advantage of the brake for stopping the propeller. This period of time is substantially the same if the engine is completely stopped before operation of the reversing piston, so that under this condition the brake will also be released when starting the engine, although it is not necessary that the release occur at this instant since the fluid couplings between the engines and propeller shaft will permit starting of the engines with the brake applied.

*Accelerated engine reversal*

In the operation above described, the time required to reverse each engine is governed substantially by the rapidity of movement of the operator's control lever, plus the time required (such as six seconds) to build up the pressure of fluid through choke 132 or 145 on diaphragm 129 or 142 to effect operation of the respective ahead or astern control valve devices 93 or 94, plus the time required for the reversing piston to reverse its position and then the time (such as two seconds) to obtain through choke 165 a sufficient pressure on the starting air control device 155 to cause operation thereof. It may be desired to reduce the total of this time and this may be accomplished by eliminating the chokes 132 and 145, as by removal of the check valves 134, 135 and 142 and 143 in the present structure, and by eliminating the chokes 99 and 152 as by removal of the check valves 100 and 153 of the present structure. In a structure built to provide this accelerated operation the above mentioned chokes and check valves would not be present, as will be readily apparent.

With these chokes and check valves omitted, it will be seen that in reversing an engine, say from ahead to astern, fluid under pressure will be supplied to actuate the astern control valve device 94 to supply fluid under pressure to chamber 91, below the reversing piston at the same time as fluid under pressure is released from the ahead control valve device 93 to cause operation thereof to release fluid under pressure from chamber 89 at the opposite side of the reversing piston, so that as soon as the pressure of fluid in chamber 91 predominates, the reversing piston will move to reverse the valve gear, and this movement will be cushioned by the reducing pressure of fluid in chamber 89.

Structures like shown in Figs. 13 and 14 of the drawings will be employed in connection with this accelerated operation, and the spring 169 in the fuel and brake control device 156 will cause operation of said device in response to operation of the ahead control device 93, to cut off the supply of fuel to the engine upon initiating the reversal and thus prior to obtaining a differential in pressures on the reversing piston sufficient to effect movement thereof, and the brake will be applied coincident with the cutting off of fuel. The brake and fuel control device 156 will then operate when the pressure of fluid provided by the astern control device 94 on one side of the double check valve 162 exceeds the opposing reducing pressure, to release fluid under pressure from pipe 59, but the structure shown in Fig. 13 will prevent a resupply of fuel to the engine at this time, while choke 311 in the relay valve device 18 will maintain the brake effective.

After the reversing piston 88 completes its reversing stroke, fluid under pressure will then be supplied through choke 165, to cause operation of the starting control device 155 to effect operation of the starting cylinder 39 to supply starting air to the engine and to also cause operation of the fuel control device 302 to resupply fuel to the engine. The engine may still be turning in the same direction as at the time of initiating the reversing operation, and the supply of starting air or of starting air and fuel to the engine will then cause stopping of the engine followed by starting in the opposite direction.

It is desired to retain the choke 165 in an equipment to provide this accelerated reversal in order to ensure that the valve gear will be fully reversed before starting of the engine in the reverse direction.

Either the structure shown in Fig. 12 or that shown in Fig. 2 comprising choke 138 and check valve 139 will be employed in the equipment for reasons hereinbefore described.

Selective individual control of engines

In certain marine service employing a plurality of engines arranged to operate in multiple to drive a ship's propeller and arranged to be controlled in multiple from a single control device, such as the pilot's control device 67 in the present application, it is at times desirable to be able to disconnect at least one of the engines from the propeller and from the pilot's control station for independent control and operation, as for driving other apparatus such as fire pumps. According to the present invention this may be accomplished, for instance with engine 1, by moving the control lever 6 for clutch 4 to disengaged position indicated by dot and dash line 7, to disconnect said engine from drive shaft 3, and by also operating lever 203 of the respective selector valve device 68 to turn the rotary valve 202 from its remote control position (Fig. 2) to the local control position (Fig. 3) in which the respective maneuvering control device 65 is disconnected from the pilot's control device 67 and connected to the local engineer's control device 66. This operation of the selector valve device 68, associated with engine 1, will not affect in any way the control of engine 2 by the pilot's control device 67 in the manner above described. It should however be noted that disengagement of the clutch 4 for engine 1 will actuate the respective interlock valve device 25 to close communication between pipe 23 and pipe 59 on engine 1 and to open pipe 23 to the atmosphere, whereby the stopping of engine 1 cannot cause operation of the brake to brake the propeller shaft 11 and thus interfere with propulsion of the ship by engine 2. Under this condition the control of the brake is wholly under the control of the maneuvering control device 65 associated with engine 2; the double check valve 22 being operative to close communication between pipes 19 and 23 to provide for this control.

With the selector valve device 68, associated with engine 1, in its local control position as shown in Fig. 3 connecting the maneuvering control device on said engine to the respective engineer's control device 66, it will be readily apparent that by operation of said engineer's control device by the engineer in the same manner as the pilot's control valve device 67 was operated as above described, the maneuvering gear control device 65 of engine 1 will operate to effect starting, stopping and reversing of engine 1 in the same manner as above described, but independently of the operation of engine 2 as controlled by the pilot's control device 66.

In a manner like that just described, movement of the selector valve device 68, associated with engine 2, to its local position will transfer the control of said engine from the pilot's control device 67 to the engineer's control device 66 for that engine, and with the respective clutch control lever 6 in its disengaged position, the engine 2 may be controlled by the engineer independently of the engine 1, which may remain under the control of the pilot's control device 6.

It will also be apparent that in case of failure for instance of the pilot's control device 67, movement of both selector valve devices 68 to their local control position will transfer the control of said engines to the individual engineer's control devices 66, whereby the engineer may individually control the operation of both engines for driving the propeller shaft 11. Return of the selector valve devices 68 at either one or both engines to their remote control positions will transfer control of that engine or engines from the engineer back to the pilot, as will be apparent.

Safety features

Now referring to the purpose of the three check valves 277, 278 and 279 associated with each of the maneuvering control devices 65. In each maneuvering control device the check valve 277 is arranged to allow flow of fluid from the fluid supply passage 106 to the rotary valve chamber 275 wherein it is effective on the rotary valve 202 to maintain same seated against pressure of fluid which at different times is effective on the seating face of said valve tending to unseat same. In the maneuvering control device 65, associated with engine 1, the supply of fluid to passage 106 is obtained from the reducing valve device 70 through pipe 74, while in the maneuvering control device associated with engine 2 this supply of fluid to passage 106 is obtained from pipe 75 supplied with fluid under pressure from the reducing valve device 71. With both pipes 74 and 75 thus supplied with fluid under pressure, as normally intended, the communications controlled by check valves 278 and 279 perform no useful function.

In case of failure of the supply of fluid pressure to pipe 75, due for instance to rupture of said pipe or to failure of the reducing valve device 71 to operate as intended, a loss of fluid under pressure from the rotary valve chamber 275 of the selector valve device 68, associated with engine 2, may occur by leakage past the check valve 277, then, if the pilot's control valve device is moved to either "Run and Idle" position for supplying fluid under pressure to either the ahead control pipe 205 or astern control pipe 206, such pressure acting on the seat of rotary valve 202 at engine 2 would tend to blow said valve away from its seat. This, however, will be prevented by the connections including check valves 278 and 279 between passage 276 and the passages connected to the ahead and astern control pipes 205 and 206, since upon supply of fluid under pressure to either one of these pipes the pressure of such fluid will become effective past one of the check valves in the rotary valve chamber 275 at engine 2 to act on and maintain the rotary valve 202 in said chamber seated against the pressure of fluid from the one of said pipes acting on the seating face of the valve.

The communications including the check valves 278 and 279 in the maneuvering control device 65, associated with engine 1, will not and are not intended to act in the manner just described for those associated with engine 2 in case of failure of fluid pressure in the supply pipe 74, since such failure will result in failure of supply of fluid pressure to the pilot's control device 67 rendering same ineffective to supply fluid under pressure to either the ahead or astern control pipes 205 or 206.

When an operator is working on an engine making adjustment to the valve gear or any other part of the engine, it is desirable to prevent that engine from being unintentionally started by operation of either the engineer's control device 66 or of the pilot's control device 67, and this may be accomplished by the cut-off valves 80 and 79 which may be located immediately adjacent the respective engines 1 and 2.

As before mentioned, both of the cut-off valves 80 and 79 are of the type arranged to close communication through the pipes in which they are disposed and to release fluid under pressure from the pipe connected to the outlet side thereof. Thus movement of the cut-off valve 80 to its closed position will vent the fluid pressure from the pipe between said valve and the maneuvering control valve 65 associated with engine 1 and thereby release the fluid pressure from passage 106 in the bracket 85 and thus from valve chamber 96 in the respective ahead and astern control valve devices 93 and 94.

In case the pilot's control valve device 67 should be unintentionally operated, with the cut-off valve 80 closed, to supply fluid to either the ahead or astern control pipe 205 or 206 and thence to either the ahead or astern valve device 73 or 94 at engine 1, the operation of the latter device will have no effect upon the reversing piston 88 at said engine, and said piston will remain in its last occupied position with the chambers at the opposite sides open to atmosphere either by way of the release valves 97 and 141 in said ahead astern control valve devices, or past the supply valves 95 and 141 to chamber 96 which will be open to the atmosphere at this time by way of the closed cut-off valve 80. Movement of the pilot's control valve device 67 to either "Start" position will supply fluid under pressure to the starting control pipe 207 through which it will flow to chamber 160 in the starting control device 155 at engine 1, but said starting control device cannot be operated to supply fluid to the starting air pipe 31 with the cut-off valve 80 closed and causing chambers 89 and 91 at opposite sides of the reversing piston 88 to be open to the atmosphere. Thus with the cut-off valve 80 closed the maneuvering control device 65, associated with engine 1, cannot be operated from either the pilot's or engineer's station to change the condition of said engine while being worked upon by a workman, and the same is true with respect to engine 2 upon closing of the cut-off valve 79.

The closing of the cut-off valve 80 with the consequent cutting off of the supply of fluid under pressure for holding seated the rotary valve 202 in the selector valve device 68 associated with engine 1 would result, in case of loss of fluid pressure from said chamber by leakage past the check valve 277, in blowing the rotary valve 202 off of its seat upon operation of the pilot's control device 67 for controlling the operation of engine 2, in case it is an operating condition. This however is prevented by supplying fluid under pressure to the rotary valve chamber from either the ahead or astern control pipes 205 or 206 by way of the check valves 278 or 279, respectively, in the manner above described.

In a like manner the communications including check valves 278 and 179 in the selector valve device 66, associated with engine 2, function to prevent the rotary valve 202 therein from being blown from its seat upon operation of the pilot's control device 67 in case the cut-off valve 79 in the fluid pressure supply connection to the maneuvering control device 65 associated with engine 2 is closed.

The closing of either cut-off valve 79 or 80 cuts off the supply of fluid pressure to the respective engineer's control device 66, so that operation of said device can have no effect upon the respective maneuvering control device 65.

From the above description it will be seen that in each maneuvering control device, the purpose of check valve 277 is to prevent flow to passage 106 of fluid supplied past either check valve 278 or 279 to passage 276. The check valve 278 acts in a like manner upon supply of fluid under pressure to passage 276 past either check valve 277 or 279, while check valve 279 also acts in the same manner upon supply of fluid under pressure to passage 276 past either check valve 277 or 278.

In case the system is not provided with the engineer's control devices 66 for individually controlling the two engines, or in case it is necessary to remove either one or both of said devices without replacement, then a blanking plate (not shown) will be provided over the mounting face 220 of the respective maneuvering control device for closing the ends of the communications opening at said face. Under such a condition local individual control of the engines will be provided for by usual hand operated means (not shown), and in order to prevent interference from the pilot's control device 67 with this local control, it is necessary that the selector valve device 68 on the engine be turned from its remote control position to its local control position for interrupting the control connections between the pilot's control device and the respective maneuvering control device. It is also necessary under such a condition to cut off the supply of fluid under pressure to the timing and interlock valve device 87 associated with the maneuvering control device 67 on the engine which is going to be locally controlled manually. To accomplish this, the plug 215 will be removed from the end of passage 214 and placed in the end of passage 106 which is shown in Fig. 2 of the drawing as being open to chamber 105, so that, in the local control position of the selector valve device 68, the supply of fluid under pressure to the respective timing and interlock valve device 87 will not only be cut off but the supply passage 104 will also be opened to the atmosphere through passage 214, a cavity 280 in the rotary valve 202 and the atmospheric port 217. With passage 104 thus opened to atmosphere, fluid under pressure will be released from pipe 31 and the starting air cylinder 39, and from the ahead and astern control devices 93 and 94, and the opposite sides of the reversing piston 88 will be opened to atmosphere as above described to eliminate all possible interference with the local control of the engine by the hand operated means above mentioned.

In case an engineer's control device 66 is not provided on the maneuvering control devices 65 the plug 215 may permanently remain in the end of passage 106, since in the remote control position of the selector valve device 68, a supply of fluid pressure to the timing and interlock valve device 87 will then be provided through passage 106, cavity 213 in the rotary valve 202 and passage 214.

SUMMARY

From the above description it will now be seen that we have provided a fully pneumatic system equally adapted to remote and local control for controlling automatically in a required sequence a plurality of different operations. As employed for controlling the reversing of a reversible internal combustion engine the system is operable automatically in response to movement of an operator's control device in effecting the reversal of the engine, to first cut off the supply of fuel to the engine and to maintain the fuel cut off until after the engine's valve gear or timing has been reversed, and at the same time apply a brake to the engine for stopping same. Next the system acts to reverse the engine's valve gear or timing, followed by supplying starting air to the engine for braking same, if the engine is not already stopped, and to cause starting of the engine after it is stopped. Fuel is automatically resupplied to the engine preferably at the same time as starting air is supplied to aid in stopping the engine in case it is not already stopped and to accelerate starting and running thereof in the reverse direction. The supply of fuel may be delayed with respect to the supply of starting air, if desired. The brake is automatically released at about the time that fuel is resupplied to the engine or when the engine is in condition for operation in the reverse direction.

After the engine is started, the supply of starting air to the engine is cut off by movement of the operator's control lever out of the "Start" position and said lever is then operable to control the speed or power output of the engine, and when desired, to cause stopping of the engine by operation to cut off the supply of fuel to the engine.

The system provides for either individual or multiple control pneumatically of a plurality of engines. The multiple control from a single control valve device is provided through a plurality of connecting pipes particularly adapted for remote control since they permit locating the remote control valve device without regard to the location of the engines, without regard to future maintenance such as adjustments for wear, or to relative movement between the engines and a remote control station which may exist in certain installations such as on ships.

It will also be seen that the system is relatively compact in structure, exact in operation, and extremely simple to control for the operations involved.

It is desired to point out, however, that the engine structure shown in the drawings and above described is merely illustrative and not limiting, since the invention may be employed to control different engine structures. It is further desired to point out that the terms "Ahead" and "Astern" as employed in the above description and in certain of the appended claims in connection with different directions of engine operation are to be interpreted as synonymous with, respectively, forward and reverse, or one direction and opposite direction etc.

Having now described our invention what we claim as new and desire to secure by Letters Patent, is:

1. In combination, a fluid motor operable upon release of fluid under pressure from one passage and supply of fluid under pressure to a second passage to one position and operable upon release of fluid under pressure from said second passage and supply of fluid under pressure to said one passage to another position, one valve means controlled by pressure of fluid in a first chamber and operable upon an increase in such pressure to a certain degree to supply fluid under pressure to said one passage and operable to release fluid under pressure from said one passage upon a reduction in pressure in said chamber to a lower degree, a second valve means controlled by pressure of fluid in a second chamber and operable upon an increase in such pressure to a certain degree to supply fluid under pressure to said second passage and operable to release fluid under pressure from said second passage upon a reduction in pressure in said second chamber to a lower degree, an operator's control device having a first position for supplying fluid under pressure to said one chamber and for releasing fluid under pressure from said second chamber and having a second position for supplying fluid under pressure to said second chamber and for releasing fluid under pressure from said one chamber, choke means arranged to restrict flow of fluid under pressure to each of said chambers to delay obtaining the said certain pressure therein for a chosen interval of time after movement of said control device, and means providing for a more rapid release of fluid under pressure from each of said chambers.

2. In combination, a fluid motor operable upon release of fluid under pressure from one passage and supply of fluid under pressure to a second passage to one position, and operable upon release of fluid under pressure from said second passage and supply of fluid under pressure to said one passage to another position, movable control means having two control positions, valve means conditionable by said control means in one of said two positions to effect a supply of fluid under pressure to said one passage and a release of fluid under pressure from said second passage and conditionable by said control means in its other position to effect a supply of fluid under pressure to said second passage and a release of fluid under pressure from said one passage, and automatic timing means for delaying said supply of fluid under pressure to said one and second passages for a chosen interval of time after movement of said control means to, respectively, its said one and other positions.

3. In combination, a fluid motor operable upon release of fluid under pressure from one passage and supply of fluid under pressure to a second passage to one position, and operable upon release of fluid under pressure from said second passage and supply of fluid under pressure to said one passage to another position, movable control means having two control positions, valve means conditionable by said control means in one of said two positions to effect a supply of fluid under pressure to said one passage and a release of fluid under pressure from said second passage and conditionable by movement of said control means to its other position to effect a supply of fluid under pressure to said second passage and a release of fluid under pressure from said one passage, automatic timing means for delaying said supply of fluid under pressure to said one and second passages for a chosen interval of time after movement of said control means to, respectively, its said one and other positions, means for retarding release of fluid under pressure from said motor through each of said passages, and means for permitting a more rapid flow of fluid under pressure through said passages to said motor.

4. In combination, reversing piston means controlled by opposing pressures of fluid in two chambers and movable to one position upon supply of fluid under pressure to one of said chambers and release of fluid under pressure from the other and movable to another position upon supply of fluid under pressure to said other chamber and release of fluid under pressure from said one chamber, starting control means movable by fluid under pressure in a third chamber to a starting position and movable out of said starting position upon release of fluid under pressure from said third chamber, a fluid pressure supply and release communication for said third chamber, means cooperative with said piston means in said one and other positions for opening said communication to, respectively, said one and second chambers and when out of said one and other positions for opening said communication to the one of said two chambers from which fluid under pressure is released, and means for supplying fluid under pressure to either one of said two chambers and for releasing fluid under pressure from the other one of said two chambers.

5. In combination, reversing piston means subject to opposing pressures of fluid in two chambers and movable to one position upon supply of fluid under pressure to one of said two chambers and release of fluid under pressure from the other, and movable to another position upon supply of fluid under pressure to said other chamber and release of fluid under pressure from said one chamber, starting means, starting control means movable by fluid under pressure in a third chamber to a starting position for effecting operation of said starting means, and movable out of said starting position upon release of fluid under pressure from said third chamber to prevent operation of said starting means, a fluid pressure supply and release communication for said third chamber, means cooperative with said piston means in said one and other positions for opening said communication to the one of said two chambers supplied with fluid under pressure and when out of said one and other positions for opening said communication to the one of said two chambers from which fluid under pressure is released, and manually controlled means having first and second positions for effecting supply of fluid under pressure to said one chamber and release of fluid under pressure from said other chamber, and having third and fourth positions for effecting supply of fluid under pressure to said other chamber and release of fluid under pressure from said one chamber, said manually controlled means including means cooperative with said starting control means in its starting position to effect operation of said starting means in both of said second and fourth positions of said manually controlled means and to prevent operation of said starting means in both of said first and third positions of said manually controlled means.

6. In combination, a reversing piston movable to one position upon supply of fluid under pressure to one side with the opposite side open to atmosphere and movable to another position upon supply of fluid under pressure to said opposite side with said one side open to atmosphere, a pipe, means cooperative with said piston in its said one and second positions to open said pipe to the high pressure side of said piston and during movement of said piston between its said one and second positions to open said pipe to the low pressure side of said piston, starting control means responsive to pressure of fluid in said pipe and adapted to be operated by fluid under pressure from the high pressure side of said piston to a starting position and operative upon opening said pipe to the low pressure side of said piston out of said starting position, second and third pipes connected respectively to said one and opposite sides of said piston, an operator's control device for selectively effecting a supply of fluid under pressure to said second pipe and for at the same time effecting opening of said third pipe to atmosphere, or for effecting a supply of fluid under pressure to said third pipe and for at the same time effecting opening of said second pipe to atmosphere, choke means for restricting flow of fluid through the first named pipe to said starting control means, and a one-way flow communication including a double check valve and means connecting said double check valve to said second and third pipes for releasing fluid under pressure from said first named pipe to either said second pipe or third pipe.

7. In combination, a reversing piston movable by fluid under pressure acting on one side upon release of fluid under pressure from the opposite side to one position and movable by fluid under pressure acting on said opposite side upon release of fluid under pressure from said one side to another position, a first pipe, a second pipe, a third pipe, an operator's control device having first and second positions for supplying fluid under pressure to said first pipe and for releasing fluid under pressure from said second pipe, and having third and fourth positions for supplying fluid under pressure to said second pipe and for releasing fluid under pressure from said first pipe, and for also supplying fluid under pressure to said third pipe in both of said second and third positions and for releasing fluid under pressure from said third pipe in both of said first and fourth positions, a first valve device responsive to fluid under pressure supplied to said first pipe to supply fluid under pressure to said one side of said piston and responsive to release of fluid under pressure from said first pipe to release fluid under pressure from said one side of said piston, a second valve device responsive to fluid under pressure supplied to said second pipe to supply fluid under pressure to said opposite side of said piston and responsive to release of fluid under pressure from said second pipe to release fluid under pressure from said opposite side of said piston, means for restricting supply of fluid under pressure to each of said first and second valve devices from the respective pipes and providing for a more rapid rate of release of fluid under pressure therefrom, fluid pressure actuated starting means, a communication for connecting said third pipe to said starting means, starting control means responsive to a chosen pressure of fluid in a chamber to open said communication and responsive to a lower pressure of fluid in said chamber to close said communication, means for opening the high pressure side of said piston to said chamber in said one and other positions of said piston to provide said chosen pressure of fluid in said chamber and for opening said chamber to the low pressure side of said piston in all other positions of said piston to provide said lower pressure of fluid in said chamber, choke means for restricting flow of fluid under pressure from the high pressure side of said piston to said chamber for delaying operation of said starting control means for a chosen interval of time after movement of said piston to either its said one or other position, a one-way flow communication open to said chamber, and a double check valve connecting the last named communication to said first and second valve devices for releasing fluid under pressure from said chamber upon operation of either one of said valve devices to release fluid under pressure from the respective side of said piston.

8. In combination, fluid pressure actuated starting control means, reversing means having first and second positions, an operator's control valve device having one position for effecting movement of said reversing means to said first position and having another position for effecting movement of said reversing means to said second position, means operable upon movement of said operator's control valve device to either one of its said positions to delay for a chosen interval of time after such movement, the said operation of said reversing means, means controlled by said reversing means operable in the first and second positions thereof to supply actuating fluid pressure to said starting control means, and timing means for restricting flow of actuating fluid pressure to said starting control means to delay operation thereof for a chosen interval of time after movement of said reversing means to either one of its first or second positions.

9. In combination, a reversing member, an operator's control device having a first position for effecting movement of said reversing member to one position, and having a second position and also a third position for effecting movement of said reversing member to another position, fluid pressure operated starting means, a communication for conveying fluid under pressure to and for releasing fluid under pressure from said starting means, starting control means controlling said communication, means for effecting operation of said starting control means to open said communication in both of said positions of said reversing member and for effecting operation of said starting control means to close said communication during movement of said reversing member from either one of its said positions to the other, said operator's control device comprising means for effecting clousre of said communication and releasing fluid under pressure from said starting means in said second position, and for effecting opening of said communication in its said third position, choke means in said communication for restricting rate of flow of fluid under pressure to said starting means, a communication having greater flow capacity than said choke means and by-passing said choke means for releasing fluid under pressure from said starting means, and a check valve in the last named communication for preventing flow of fluid under pressure through said last named communication to said starting means.

10. In combination, fluid pressure operable starting means, a communication for conveying fluid under pressure to and for releasing fluid under pressure from said starting means, two pipes, a reversing member movable to one position upon supply of fluid under pressure to one of said two pipes and release of fluid under pressure from the other pipe and movable to another position upon supply of fluid under pressure to said other pipe and release of fluid under pressure from said one pipe, an operator's control device having a first position for supplying fluid under pressure to said one pipe and for releasing fluid under pressure from said other pipe, and having a second position for supplying fluid under pressure to said other pipe and for releasing fluid under pressure from said one pipe and for also opening said communication for supplying fluid under pressure to said starting means, valve means controlled by said reversing member for opening said communication in said one and other positions of said reversing member and for closing said communication and effecting release of fluid under pressure from said starting means during movement of said reversing member from either one of its said positions to the other, and other means for closing said communication upon supply of fluid to either one of said pipes, when the pressure of such fluid is less than that in the other pipe, and for opening said communication upon an increase in pressure in the last named pipe to a degree exceeding the opposing pressure of fluid in the other pipe.

11. In combination, a fluid pressure controlled reversing piston, two valve means one for controlling supply and release of fluid under pressure to and from each side of said piston, an operator's control device for selectively effecting operation of either one of said valve means for supplying fluid under pressure to the respective side of said piston while effecting operation of the other valve means to release fluid under pressure from the opposite side of said piston, means for delaying for a chosen interval of time response of each of said valve means to operation of said control device to supply fluid under pressure to the respective side of said piston, fuel control means operable by fluid under pressure to a fuel cut-off position and upon release of fluid under pressure to a fuel supply position, and means including a double check valve subject opposingly to pressures of fluid acting on opposite sides of said piston for opening said fuel control means to the side of said piston subject to the higher pressure of fluid.

12. In combination, a reversing piston movable to one position upon supply of fluid under pressure to one side and release of fluid under pressure from the opposite side and movable to another position upon supply of fluid under pressure to said opposite side and release of fluid under pressure from said one side, two valve means one for controlling supply of fluid under pressure to and its release from each side of said piston, an operator's control device for selectively effecting operation of either one of said valve means to supply fluid under pressure to the respective side of said piston while effecting operation of the other valve means to release fluid under pressure from the opposite side of said piston, fluid pressure actuated starting means, means for connecting said starting means to the high pressure side of said piston when in either of its above named positions and to low pressure side of said piston upon operation of said valve means to effect movement and during movement of said piston from either one of its positions to the other, fluid pressure controlled fuel control means, a communication for conveying fluid under pressure to and from said fuel control means for controlling operation thereof, and means for selectively opening said communication to the side of said piston subject to the higher pressure of fluid and for at the same time closing said communication to the opposite side of said piston.

13. In combination, a reversing piston movable to one position upon supply of fluid under pressure to one side and release of fluid under pressure from the opposite side and movable to another position upon supply of fluid under pressure to said opposite side and release of fluid under pressure from said one side, two valve means one for controlling supply of fluid under pressure to and its release from each side of said piston, an operator's control device for selectively effecting operation of either one of said valve means to supply fluid under pressure to the respective side of said piston while effecting operation of the other valve means to release fluid under pressure from the opposite side of said piston, fluid pressure actuated starting means, means for connecting said starting means to the high pressure side of said piston when in either of its above named positions and to the low pressure side of said piston upon operation of said valve means to effect movement and during movement of said piston from either one of its positions to the other, fluid pressure controlled fuel control means, a communication for conveying fluid under pressure to and from said fuel control means for controlling operating thereof, means for selectively opening said communication to the side of said piston subject to the higher pressure of fluid and for at the same time closing said communication to the opposite side of said piston, and means for delaying for a chosen interval of time, after operation of said operator's control device, response of each of said valve means to supply of fluid under pressure.

14. In combination, a reversing piston movable to one position upon supply of fluid under pressure to one side and release of fluid under pressure from the opposite side and movable to another position upon supply of fluid under pressure to said opposite side and release of fluid under pressure from said one side, two valve means one for controlling supply of fluid under pressure to and its release from each side of said piston, an operator's control device for selectively effecting operation of either one of said valve means to supply fluid under pressure to the respective side of said piston while effecting operation of the other valve means to release fluid under pressure from the opposite side of said piston, fluid pressure actuated starting means, fuel cut-off means operable by fluid under pressure to a fuel cut-off position and adapted to move to a fuel supply position when relieved of pressure of fluid, means including a double check valve subject opposingly to pressures on opposite sides of said piston and responsive to release of fluid under pressure from either side of said piston to supply fluid under pressure to said cut-off means and responsive to supply of fluid under pressure to the opposite side of said piston to release fluid under pressure from said cut-off means, latching means for holding said fuel cut-off means in said cut-off position upon release of fluid under pressure therefrom and adapted to be rendered ineffective by fluid under pressure, and means for supplying fluid under pressure to said starting means and latching means from the high pressure side of said piston when in either of its above named positions and for opening said starting means and latching means to the low pressure side of said piston upon operation of said valve means to effect movement and during movement of said piston from either one of its positions to the other.

15. In combination, a reversing piston movable to one position by fluid under pressure acting on one side upon release of fluid under pressure on the opposite side and movable to another position by fluid under pressure acting on said opposite side upon release of fluid under pressure on said one side, valve means for selectively effecting supply of fluid under pressure to and its release from opposite sides of said piston, an operator's control device having a first position for effecting operation of said valve means to release fluid under pressure from said opposite side of said piston and to supply fluid under pressure to said one side and having a second position for effecting operation of said valve means to release fluid under pressure from said one side of said piston and to supply fluid under pressure to said opposite side, fluid pressure actuated starting means, a communication open at one end to said starting means for conveying fluid under pressure to and for releasing fluid under pressure from said starting means, means for opening said communication in said one and other positions of said piston and for closing said communication with said piston between its said one and other positions, said operator's control device being connected to the other end of said communication and comprising means for supplying fluid under pressure to and for releasing fluid under pressure from said communication, fuel control means, means for effecting operation of said fuel control means to a fuel cut-off position simultaneous with operation of said valve means to release fluid under pressure from said one side of said piston, and for permitting operation of said fuel control means to a fuel supply position upon operation of said valve means to supply fluid under pressure to the opposite side of said piston, and automatically operative delay means for delaying operation of said fuel control means to its fuel supply position for a chosen interval of time after initiating operation of said valve means to supply fluid under pressure to said opposite side of said piston.

16. In combination, a reversing piston movable to one position by fluid under pressure acting on one side upon release of fluid under pressure on the opposite side and movable to another position by fluid under pressure acting on said opposite side upon release of fluid under pressure on said one side, valve means for controlling the supply of fluid under pressure to and its release from opposite sides of said piston, an operator's control device for controlling said valve means and having a first position for effecting operation of said valve means to release fluid under pressure from said opposite side of said piston and to supply fluid under pressure to said one side and having a second position for effecting operation of said valve means to release fluid under pressure from said one side of said piston and to supply fluid under pressure to said opposite side, fluid pressure actuated starting means, fuel control means movable to a fuel cut-off position upon supply of fluid under pressure to a control chamber and to a fuel supply position upon release of fluid under pressure from said control chamber, fluid pressure controlled means for releasing fluid under pressure from said control chamber upon supply of fluid under pressure to another chamber and for supplying fluid under pressure to said control chamber upon release of fluid under pressure from said other chamber, means for effecting a release of fluid under pressure from said other chamber upon release of fluid pressure from either side of said piston and for effecting a supply of fluid under pressure to said other chamber upon supply of fluid under pressure to the opposite side of said piston, and means including said piston for supplying fluid under pressure to said starting means in each of the said positions of said piston and for releasing fluid under pressure from said starting means with said piston out of its said positions.

17. In combination, a reversing piston movable to one position by fluid under pressure acting on one side upon release of fluid under pressure on the opposite side and movable to another position by fluid under pressure acting on said opposite side upon release of fluid under pressure on said one side, valve means for controlling the supply of fluid under pressure to and its release from opposite sides of said piston, an operator's control device for controlling said valve means and having a first position for effecting operation of said valve means to release fluid under pressure from said opposite side of said piston and to supply fluid under pressure to said one side and having a second position for effecting operation of said valve means to release fluid under pressure from said one side of said piston and to supply fluid under pressure to said opposite side, automatic timing means for delaying for a chosen interval of time the supply of fluid under pressure to said one and opposite sides of said piston by operation of said operator's control device, fluid pressure actuated starting means rendered ineffective upon release of fluid pressure, means cooperative with said piston in said one and other positions to supply fluid under pressure for actuating said starting means and to prevent such supply during movement of said piston between its said position, means for releasing fluid under pressure from said starting means with said piston in either of its said positions, and fuel control means movable to a fuel cut-off position in response to operation of said operator's control device to release fluid under pressure from either side of said piston, and movable to a fuel supply position upon supply of fluid under pressure to either side of said piston.

18. In combination, a reversing piston movable to one position by fluid under pressure acting on one side upon release of fluid under pressure on the opposite side and movable to another position by fluid under pressure acting on said opposite side upon release of fluid under pressure on said one side, valve means for controlling the supply of fluid under pressure to and its release from opposite sides of said piston, an operator's control device for controlling said valve means and having a first position for effecting operation of said valve means to release fluid under pressure from said opposite side of said piston and to supply fluid under pressure to said one side, and having a second position for effecting operation of said valve means to release fluid under pressure from said one side of said piston and to supply fluid under pressure to said opposite side, automatic timing means for delaying for a chosen interval of time the said supply of fluid under pressure to said one and opposite sides of said piston, fluid pressure actuated starting means, means for effecting a supply of fluid under pressure to said starting means in said one and other positions of said piston and for preventing such supply during movement of said piston between its said one and other positions, means for releasing fluid under pressure from said starting means with said piston in its said one and other positions, fluid pressure actuated fuel control means, and means including a double check valve for selectively opening a fluid pressure control communication to said fuel control means from either said one side or said opposite side of said piston whichever is subject to the greater pressure.

19. In combination, a reversing piston movable to one position by fluid under pressure acting on one side upon release of fluid under pressure on the opposite side and movable to another position by fluid under pressure acting on said opposite side upon release of fluid under pressure on said one side, valve means for controlling the supply of fluid under pressure to and its release from opposite sides of said piston, an operator's control device for controlling said valve means and having a first position for effecting operation of said valve means to release fluid under pressure from said opposite side of said piston and to supply fluid under pressure to said one side and having a second position for effecting operation of said valve means to release fluid under pressure from said one side of said piston and to supply fluid under pressure to said opposite side, fluid pressure actuated starting means, means for supplying fluid under pressure to said starting means with said piston in its said positions and for preventing such supply during movement of said piston between its said one and other position, choke means for restricting the rate of said supply of fluid under pressure to said starting means, a one-way flow communication of greater flow capacity than said choke means for releasing fluid from said starting means and opened upon release of fluid under pressure from either side of said piston, said operator's control device controlling the supply of fluid under pressure to said starting means and being operative in both of its above named positions to prevent such supply and being movable to another position to permit such supply, and fuel control means movable to a fuel cut-off position upon release of fluid under pressure from either side of said piston, and to a fuel supply position in response to supply of fluid at a greater pressure to the opposite side of said piston.

20. In combination, a reversing piston movable to one position upon supply of fluid under pressure to one side with fluid under pressure released from the opposite side and movable to another position upon supply of fluid under pressure to said opposite side with fluid under pressure released from said one side, one valve device for supplying fluid under pressure to said one side of said piston upon a chosen increase in pressure of fluid in a chamber and for releasing fluid under pressure from said one side of said piston upon release of fluid under pressure from said chamber, a second valve device for supplying fluid under pressure to said opposite side of said piston upon a chosen increase in pressure of fluid in a second chamber and for releasing fluid under pressure from said opposite side of said piston upon release of fluid under pressure from said second chamber, an operator's control device for selectively supplying fluid under pressure to either one of said chambers and for at the same time releasing fluid under pressure from the other chamber, fluid pressure controlled fuel control means, a fluid pressure supply and release control passage for said fuel control means, a double check valve subject to opposing pressures of fluid acting on opposite sides of said piston for opening said control passage to the side of said piston subject to the higher pressure of fluid, fluid pressure actuated starting means, starting control means for supplying fluid under pressure to actuate said starting means upon supply of fluid under pressure to a control chamber and for cutting off the supply of fluid under pressure to said starting means upon release of fluid under pressure from said control chamber, means cooperable with said piston in each of its said two positions to open said control chamber to the high pressure side of said piston, and to disconnect said control chamber from the high pressure side of said piston and release fluid under pressure from said control chamber with said piston out of its said positions, and an unrestricted one-way flow communication connecting said control chamber to said passage for releasing fluid under pressure from said control chamber, said operator's control device cooperating with said starting control means for controlling said supply of fluid under pressure to said starting means and comprising means for preventing supply of fluid under pressure to said starting means.

21. In combination, brake control means, reversing means, starting control means, an operator's control device movable from one position to another position, means responsive to movement of said operator's control device from said one position to effect movement of said brake control means to a braking position, means responsive to movement of said operator's control device to said other position to effect operation of said reversing means and also to effect movement of said brake control means to a brake release position, automatic delay means for delaying movement of said brake control means to said brake release position for a chosen interval of time after movement of said control device to its other position, and means for effecting operation of said starting control means to a starting position upon cessation of operation of said reversing means.

22. In combination, fluid pressure actuated brake control means, reversing piston means movable to one position upon supply of fluid under pressure to one side of said piston means and release of fluid under pressure from the opposite side, and movable to another position upon supply of fluid under pressure to said opposite side and release of fluid under pressure from said one side, fluid pressure operable starting means, control means including an operator's control device having a first position for effecting a supply of fluid under pressure to said one side of said piston means and for releasing fluid under pressure from the opposite side, and having a second position for effecting a supply of fluid under pressure to said opposite side of said piston means and a release of fluid under pressure from said one side of said piston means, valve means for effecting a supply of fluid under pressure to said brake control means upon movement of said operator's control device out of said first position and for effecting a release of fluid under pressure from said brake control means in response to movement of said operator's control device to its said second position, delay means for delaying response of said valve means to said movement of said operator's control device to its said second position, and means for effecting a supply of fluid under pressure to said starting means upon cessation of movement of said piston means by pressure of fluid acting on said opposite side of said piston means.

23. In combination, two pipes, reversing means operable upon release of fluid under pressure from one of said pipes and supply of fluid under pressure to the other of said pipes to one position and operable upon release of fluid under pressure from said other pipe and supply of fluid under pressure to said one pipe to another position, manual control means having one position for effecting a supply of fluid under pressure to said one pipe and a release of fluid under pressure from said other pipe and having a second position for effecting a supply of fluid under pressure to said other pipe and a release of fluid under pressure from said one pipe, fuel control means, brake control means, interlock means including means subject to opposing pressures of fluid in said pipes for effecting operation of said fuel control means to a fuel cut-off position and of said brake control means to a braking position upon reducing the pressure of fluid in either one of said pipes, and responsive to pressure of fluid in the other pipe when such pressure exceeds the opposing pressure in the one pipe for effecting operation of said fuel control means to a fuel supply position and of said brake control means to a brake release position, fluid pressure actuated starting control means, and means including said reversing means for supplying fluid under pressure to said starting control means with said reversing means in either said one or other positions and for at all other times releasing fluid under pressure from said starting control means, said manual control device in said first and second positions rendering said starting control means ineffective and in a third position effective.

24. In combination, two pipes, reversing means operable upon release of fluid under pressure from one of said pipes and supply of fluid under pressure to the other pipe to one position and operable upon release of fluid under pressure from said other pipe and supply of fluid under pressure to said one pipe to another position, manual control means having a first position for effecting a supply of fluid under pressure to said one pipe and a release of fluid under pressure from said other pipe and having a second position for effecting a supply of fluid under pressure to said other pipe and a release of fluid under pressure from said one pipe, fuel control means, brake control means, interlock means including means subject to opposing pressures of fluid in said pipes for effecting operation of said fuel control means to a fuel cut-off position and of said brake control means to a braking position upon a reduction in pressure of fluid in either one of said pipes, and responsive to pressure of fluid in the other pipe when it is preponderant over the opposing pressure of fluid in the one pipe for permitting operation of said fuel control means to a fuel supply position and of said brake control means to a brake release position, means for delaying operation of said brake control means to said brake release position, delay means for preventing operation of said fuel control means to said supply position upon operation of said interlock means by said preponderant pressure of fluid and responsive to supply of fluid under pressure to a chamber for effecting operation of said fuel control means to said supply position, fluid pressure actuated starting control means, means for rendering said starting control means non-operable upon release of fluid pressure, said reversing means effecting a supply of fluid under pressure to said chamber and to said starting control means in said one and other positions of said reversing means and at all other times effecting a release of fluid under pressure from said chamber and from said starting control means.

25. In combination, a reversing piston movable to one position upon supply of fluid under pressure to one face and release of fluid under pressure from the opposite face and movable to another position by fluid under pressure acting on said opposite face of said piston upon release of fluid under pressure from said one face, a first valve device for supplying fluid under pressure to said one face of said piston upon supply of fluid under pressure to one chamber and for releasing fluid under pressure from said one face of said piston upon release of fluid under pressure from said one chamber, a second valve device for supplying fluid under pressure to said opposite face of said piston upon supply of fluid under pressure to another chamber and for releasing fluid under pressure from said opposite face of said piston upon release of fluid under pressure from said other chamber, an operator's control valve device having first and second positions for supplying fluid under pressure to said one chamber and for releasing fluid under pressure from said other chamber and having third and fourth positions for supplying fluid under pressure to said other chamber and for releasing fluid under pressure from said one chamber, fuel control means, brake control means, a control device for effecting operation of said fuel control means to a fuel cut-off position and of said brake control means to a braking position upon a reduction in pressure of fluid in a third chamber, and for effecting operation of said fuel control means to a fuel supply position and of said brake control means to a brake release position upon an increase in pressure of fluid in said third chamber, means controlled by opposing pressures of fluid acting on opposite faces of said reversing piston for selectively opening said third chamber to the face of said piston subject to the higher pressure of fluid, a fluid pressure supply starting communication, starting control means for opening said communication upon supply of fluid under pressure to a fourth chamber and for closing said communication upon release of fluid pressure from said fourth chamber, said operator's control device in both of said second and fourth positions opening said communication and when out of said second and fourth positions closing said communication, means cooperable with said reversing piston for supplying fluid under pressure from the high pressure face of said piston to said fourth chamber in each of said positions of said piston and for opening said fourth chamber to the low pressure face of said piston during movement of said piston from either one of its said positions to the other, and a one-way flow communication connecting said fourth chamber to said third chamber providing for release of fluid under pressure from said fourth chamber to said third chamber.

26. In combination, reversing means, one valve means for effecting operation of said reversing means to one position, a second valve means for effecting operation of said reversing means to another position, starting valve means, speed control means, and an operator's control device comprising a movable lever having a neutral position, a first position at one side of said neutral position for effecting operation of said one valve means, and a zone of movement past said first position for controlling said speed control means, said lever having at the opposite side of said neutral position a second position for effecting operation of said second valve means and a zone of movement past said second position for controlling said speed control means, said lever being movable from each of said first and second positions in a direction at substantial right angles to a plane including said neutral and said first and second positions and said zones of movement for actuating said starting valve means.

HARRY C. MAY.
ROY R. STEVENS.

REFERENCES CITED

The following references are of record in the file of this patent:

UNITED STATES PATENTS

| Number | Name | Date |
|---|---|---|
| 471,870 | Lepley | Mar. 29, 1892 |
| 840,876 | Steedman | Jan. 8, 1907 |
| 1,304,529 | Arnold | May 27, 1919 |
| 1,900,054 | Goldberg | Mar. 7, 1933 |
| 1,907,191 | Thomas | May 2, 1933 |
| 2,025,262 | Anderson | Dec. 24, 1935 |
| 2,211,319 | Camerota | Aug. 13, 1940 |
| 2,243,883 | Ramsted | June 3, 1941 |
| 2,267,066 | Wolf | Dec. 23, 1941 |
| 2,289,654 | Keel | July 14, 1942 |
| 2,395,202 | Stevens | Feb. 19, 1946 |
| 2,413,390 | Stevens | Dec. 31, 1946 |

FOREIGN PATENTS

| Number | Country | Date |
|---|---|---|
| 557,584 | Germany | Aug. 25, 1932 |